United States Patent
Chen et al.

(10) Patent No.: US 11,706,301 B2
(45) Date of Patent: Jul. 18, 2023

(54) SERVER NODE SELECTION METHOD AND TERMINAL DEVICE

(71) Applicant: PETAL CLOUD TECHNOLOGY CO., LTD., Dongguan (CN)

(72) Inventors: Zhongxian Chen, Shenzhen (CN); Lianxi Liu, Shenzhen (CN); Bo Jiang, Shenzhen (CN)

(73) Assignee: PETAL CLOUD TECHNOLOGY CO., LTD., Dongguan (CN)

(*) Notice: Subject to any disclaimer, the term of this patent is extended or adjusted under 35 U.S.C. 154(b) by 0 days.

(21) Appl. No.: 17/264,878

(22) PCT Filed: Aug. 28, 2018

(86) PCT No.: PCT/CN2018/102804
§ 371 (c)(1),
(2) Date: Feb. 1, 2021

(87) PCT Pub. No.: WO2020/041988
PCT Pub. Date: Mar. 5, 2020

(65) Prior Publication Data
US 2021/0250408 A1 Aug. 12, 2021

(51) Int. Cl.
*H04L 29/08* (2006.01)
*H04L 67/141* (2022.01)
(Continued)

(52) U.S. Cl.
CPC ........ *H04L 67/141* (2013.01); *H04L 61/4511* (2022.05); *H04L 61/5007* (2022.05)

(58) Field of Classification Search
CPC ............... H04L 41/0654; H04L 67/325; H04L 67/1019; H04L 67/2814; H04L 67/1008;
(Continued)

(56) References Cited

U.S. PATENT DOCUMENTS 6,810,411 B1  10/2004  Coughlin et al.
8,468,196 B1 *  6/2013  Roskind ................ H04L 67/325
                                                      709/203
(Continued)

FOREIGN PATENT DOCUMENTS

CN    101989986 A   3/2011
CN    102340554 A   2/2012
(Continued)

OTHER PUBLICATIONS

Wing a Yourtchenko Cisco D: "Happy Eyeballs: Success with Dual-Stack Hosts; rfc6555.txt", Happy Eyeballs: Success With Dual-Stack Hosts; RFC6555. Txt, Internet Engineering Task Force, IETF; Standard, Internet Society (ISOC) 4, Rue Des Falaises CH-1205 Geneva, Switzerland, Apr. 6, 2012, pp. 1-15, XP015081488.
(Continued)

*Primary Examiner* — Dustin Nguyen

(57) ABSTRACT

Methods and terminal devices, including computer programs encoded on computer storage media, for selecting a server node. According to one of the methods, a terminal device first sends a connection request to one server node, and then sends a connection request to another server node after a time interval T. The terminal device first sends a connection request to a first server node. If the terminal device receives, within a first preset duration T, response information fed back by the first server node, the terminal device does not need to send a connection request to another server node. This helps save resources. In addition, the terminal device may establish a connection to a server node corresponding to received response information, and does not need to wait for feedback from another server node. This helps reduce a delay in establishing a connection between the terminal device and a server node.

12 Claims, 11 Drawing Sheets

(51) Int. Cl.
*H04L 61/4511* (2022.01)
*H04L 61/5007* (2022.01)

(58) Field of Classification Search
CPC . H04L 67/141; H04L 69/161; H04L 61/4511; H04L 61/5007; H04L 61/5076; H04L 61/3015; H04L 67/1036; G06F 9/5083; H04W 28/0842
See application file for complete search history.

(56) References Cited

U.S. PATENT DOCUMENTS

| | | | | |
|---|---|---|---|---|
| 9,319,921 | B2* | 4/2016 | Kuroda | H04W 28/0842 |
| 9,998,530 | B2* | 6/2018 | Cui | H04L 67/1036 |
| 2003/0055979 | A1 | 3/2003 | Cooley | |
| 2004/0017798 | A1* | 1/2004 | Hurtta | H04L 67/1008 370/352 |
| 2004/0059822 | A1* | 3/2004 | Jiang | H04L 69/161 709/230 |
| 2006/0129665 | A1* | 6/2006 | Toebes | H04L 67/1019 709/223 |
| 2008/0155552 | A1* | 6/2008 | Kim | G06F 9/5083 718/105 |
| 2009/0222582 | A1* | 9/2009 | Josefsberg | H04L 41/0654 709/245 |
| 2010/0082787 | A1* | 4/2010 | Kommula | H04L 67/1008 709/223 |
| 2011/0010463 | A1* | 1/2011 | Christenson | H04L 61/5076 709/245 |
| 2014/0082150 | A1* | 3/2014 | Zhao | H04L 67/2814 709/219 |
| 2015/0081926 | A1* | 3/2015 | White | H04L 61/5007 709/245 |
| 2017/0111310 | A1* | 4/2017 | Glazemakers | H04L 61/4511 |
| 2017/0295132 | A1* | 10/2017 | Li | H04L 61/3015 |
| 2018/0159941 | A1* | 6/2018 | Brandstatter | H04L 67/141 |

FOREIGN PATENT DOCUMENTS

| | | |
|---|---|---|
| CN | 104092791 A | 10/2014 |
| CN | 104144123 A | 11/2014 |
| CN | 104427011 A | 3/2015 |
| CN | 105991708 A | 10/2016 |
| WO | 2010131633 A1 | 11/2010 |
| WO | 2014040566 A1 | 3/2014 |

OTHER PUBLICATIONS

Baz Castillo Xtratelecom S.A.: "DNS SRV Resource Records for the WebSocket Protocol; draft-ibc-websocket-dns-srv-02.txt", DNS SRV Resource Records for the WebSocket Protocol; Draft-IBC-WebSocket-DNS-SRV-02. Txt, Internet Engineering Task Force, IETF; Standardworki Ngdraft, Internet Society (ISOC) 4, Rue Des Falaises CH-1205 Geneva, Switzerland, No. 2, Apr. 14, 2011, pp. 1-16, XP015075297.
Anonymous : domain name system-Browser-based DNS failover using multiple A records—Server Fault, Mar. 16, 2011, pp. 1-4, XP055801731, Retrieved from the Internet: URL: https://serverfault.com/questions/2478 85/browser-based-dns-failover-using-multiple-a-records.
Extended European Search Report issued in EP 18931842.1 dated May 18, 2021, 10 pages.
International Search Report and Written Opinion issued in PCT/CN2018/102804, dated May 30, 2019, 8 pages.
Office Action issued in CN201880087014.8, dated Jan. 19, 2023, 17 pages.

\* cited by examiner

| 4.331427 | TCP | 100.65.147.165 | 114.115.190.71 | 74 | 54294 → 8089 [SYN] Seq |
| 4.375664 | TCP | 114.115.190.71 | 100.65.147.165 | 74 | 8089 → 54294 [SYN, ACK] |
| 4.375785 | TCP | 100.65.147.165 | 114.115.190.71 | 66 | 54294 → 8089 [ACK] Seq |

SERVER NODE SELECTION METHOD AND TERMINAL DEVICE

CROSS-REFERENCE TO RELATED APPLICATIONS

This application is the U.S. national phase of International Application No. PCT/CN2018/102804 filed 28 Aug. 2018, which designated the U.S., the entire contents of which is hereby incorporated by reference.

TECHNICAL FIELD

Example embodiments relate to the field of terminal technologies, and in particular, to a server node selection method and a terminal device.

BACKGROUND

With rapid development of terminal technologies, currently, an increasing quantity of terminal devices can implement a network access function. Actually, a network access process of a terminal device is a process of information exchange between the terminal device and an internet content provider (ICP).

Currently, a process in which the terminal device accesses the ICP is as follows: A user enters a website in the terminal device, and the website includes a domain name. The terminal device sends the domain name to a domain name server (DNS). After receiving the domain name, the DNS server determines a plurality of IP addresses corresponding to the domain name, and sends information about the plurality of IP addresses to the terminal device. Each of the plurality of IP addresses corresponds to one server node. Therefore, the terminal device needs to select one server node from the plurality of server nodes, and then accesses the ICP by using the one server node.

However, the user imposes an increasingly high requirement on a network access speed of the terminal device. Therefore, how to select a server node with comparatively good network quality from a plurality of server nodes is a problem to be resolved.

FIG. 1 is a schematic diagram of a process in which a client selects one server node from a plurality of server nodes in the prior art. As shown in FIG. 1, the client sends a domain name to a DNS server. After receiving the domain name, the DNS server determines, based on the domain name, one or more IP addresses corresponding to the domain name, and generates an IP address list. For example, the IP address list includes two IP addresses: an IP 1 and an IP 2. The IP 1 corresponds to a server node 1, and the IP 2 corresponds to a server node 2.

Still referring to FIG. 1, an example in which a preset duration that is set by the client is 30 s is used. After receiving the IP address list, the client sends a first connection request to the server node 1 at 00:50 s. If the client does not receive, within is (in other words, before 01:50 s), response information fed back by the server node 1, the client continues to send a second connection request to the server node 1 at 01:50 s. If the client still does not receive, within 2 s (in other words, before 03:50 s), the response information fed back by the server node 1, the client continues to send a third connection request to the server node 1 at 03:50 s. If the client still does not receive, within 4 s (in other words, before 07:50 s), the response information fed back by the server node 1, the client continues to send a fourth connection request to the server node 1 at 07:50 s. If the client still does not receive, within 8 s (in other words, before 15:50 s), the response information fed back by the server node 1, the client continues to send a fifth connection request to the server node 1 at 15:50 s. If the client still does not receive, within 16 s (in other words, before 31:50 s), the response information fed back by the server node 1, the client theoretically needs to continue to send a sixth connection request to the server node 1 at 31:50 s. However, 31:50 s minus 00:50 s equals 31 s, which exceeds the preset duration 30 s. Therefore, the client sends the first connection request to the server node 2 at 30:50 s (00:50 s+30 s), instead of sending the sixth connection request to the server node 1 at 31:50 s (in FIG. 1, that the client sends the sixth connection request to the server node 1 at 31:50 s is indicated by using a dashed line, in other words, the client does not send the sixth connection request to the server node 1 at 31:50 s).

It can be learned that, in the prior art shown in FIG. 1, after the DNS server returns the IP address list to the client, the client first attempts to establish a connection to a server node corresponding to an IP address in the IP address list. When the server node does not respond for a long time, the client does not automatically retry a server node corresponding to another IP address in the IP address list, but tries another server node after duration in which the client attempts to establish the connection to the server node expires. This manner likely decreases the network access speed of the terminal device and deteriorates user experience.

SUMMARY

Example embodiments provide a server node selection method and a terminal device, to select a server node with comparatively good network quality from a plurality of server nodes.

According to a first aspect, an embodiment of this application provides a server node selection method, and the method is applied to a terminal device. The method includes: sending, by the terminal device, a domain name resolution request to a DNS server, where the domain name resolution request carries a domain name, and the domain name resolution request is used to request an IP address corresponding to the domain name; receiving, by the terminal device, N IP addresses fed back by the DNS server, where each of the N IP addresses corresponds to one server node, and N is greater than or equal to 2; sending, by the terminal device, a connection request to one server node in the N server nodes at a first moment; if the terminal device receives, before a second moment, response information fed back by the one server node, establishing, by the terminal device, a connection to the one server node; or if the terminal device does not receive, before a second moment, response information fed back by the one server node, sending, by the terminal device, a connection request to another server node in the N server nodes at the second moment; receiving, by the terminal device, first response information at a moment between the second moment and a third moment; and establishing, by the terminal device, a connection to a server node that sends the first response information, where the server node that sends the first response information is the one server node or the another server node.

In this embodiment of this application, the terminal device sends a connection request to a server node at a specific time interval (the terminal device first sends a connection request to one server node, and then sends a connection request to another server node after a time interval T), so that a sudden increase of concurrent visits can be avoided. The terminal device first sends a connection request to a first server node. If the terminal device receives, within a first preset duration T, response information fed back by the first server node, the terminal device does not need to send a connection request to another server node. This helps save resources. In addition, the terminal device may establish the connection to the server node corresponding to the received first response information, and does not need to wait for a feedback from another server node. This helps reduce a delay of establishing a connection between the terminal device and a server node.

In a possible implementation, when receiving second response information, the terminal device discards or skips responding to the second response information, where a server node that sends the second response information is the one server node or the another server node, and is different from the server node that sends the first response information.

For example, if the first response information received by the terminal device is sent by a server node 1, the terminal device establishes a connection to the server node 1. If the terminal device subsequently receives response information of a server node 2, the terminal device may not process or may discard the response information of the server 2. This manner helps improve processing efficiency of the terminal device and save an unnecessary calculation amount.

In a possible implementation, if the first response information is sent by the one server node, before the establishing, by the terminal device, a connection to a server node that sends the first response information, the terminal device waits for a first preset duration starting from a fourth moment at which the terminal device receives the first response information, to determine that the terminal device does not receive, within the first preset duration, response information sent by the another server node, where the first preset duration is less than a time difference between the fourth moment and the third moment.

In this embodiment of this application, an example in which the one server node is the server node 1 and the another server node is the server node 2 is used. The terminal device first sends a connection request to the server node 1, and then sends a connection request to the server node 2. After the terminal device sends the connection request to the server node 2, assuming that the first response information received by the terminal device is sent by the server node 1, the terminal device may wait for a period of time after receiving the first response information. If the terminal device receives, within this period of time, response information fed back by the server node 2, it indicates that the server node 2 responds comparatively quickly, and therefore the terminal device establishes a connection to the server node 2. Alternatively, if the terminal device does not receive, within this period of time, response information fed back by the server node 2, the terminal device establishes a connection to the server node 1. In this manner, the terminal device can flexibly select to establish the connection to the server node 1 or establish the connection to the server node 2.

In a possible implementation, a time difference between the first moment and the second moment is a first duration T, and a time difference between the second moment and the third moment is the first duration T.

In this embodiment of this application, the time difference between the first moment and the second moment and the time difference between the second moment and the third moment are the same T. Certainly, the time difference between the second moment and the third moment and the time difference between the second moment and the third moment may alternatively be different. This is not limited in the embodiments of the present disclosure.

In a possible implementation, the terminal device sends a network resource request to the server node that sends the first response information, where the network resource request is used to request a network resource; and if the terminal device does not receive, within second preset duration, the network resource fed back by the server node that sends the first response information, the terminal device sends a network resource request to the server node that sends the second response information.

In this embodiment of this application, after the terminal device establishes the connection to the server node that sends the first response information, the terminal device requests the network resource from the server node. If the terminal device does not receive, for a long time, the network resource fed back by the server node that sends the first response information, the terminal device requests the network resource from the server node that sends the second response information. This manner helps reduce a delay of requesting a network resource by the terminal device.

In a possible implementation, if the terminal device does not receive, before the third moment, the response information sent by the one server node or the another server node, the terminal device sends a connection request to a third server node in the N server nodes at the third moment; and when the terminal device receives the first response information at a moment between the third moment and a fifth moment, the terminal device establishes a connection to a server node that sends the first response information, where the server node that sends the first response information is the one server node, the another server node, or the third server node.

In this embodiment of this application, the terminal device sends a connection request to a server node at a specific time interval. This helps save resources. In addition, if the terminal device sends connection requests to a plurality of server nodes at a specific time interval, the terminal device may establish the connection to the server node corresponding to the received first response information, and does not need to wait for a feedback from another server node. This helps reduce a delay.

In a possible implementation, a time difference between the third moment and the fifth moment is the first duration T.

In this embodiment of this application, the time difference between the first moment and the second moment, the time difference between the second moment and the third moment, and the time difference between the third moment and the fifth moment may be the same T. Certainly, the time difference between the second moment and the third moment, the time difference between the second moment and the third moment, and the time difference between the third moment and the fifth moment may alternatively be different. This is not limited in the embodiments of the present disclosure.

According to a second aspect, an embodiment of this application provides a server node selection method, and the method is applied to a terminal device. The method includes: sending, by the terminal device, a domain name resolution request to a DNS server, where the domain name resolution request carries a domain name, and the domain name resolution request is used to request an IP address corresponding to the domain name; receiving, by the terminal device, N IP addresses fed back by the DNS server, where each of the N IP addresses corresponds to one server node, and N is greater than or equal to 2; sending, by the terminal device, a connection request to one server node in the N server nodes at a first moment; if the terminal device receives, before a second moment, response information fed back by the one server node, establishing, by the terminal device, a connection to the one server node; or if the terminal device does not receive, before a second moment, response information fed back by the one server node, sending, by the terminal device, a connection request to another server node in the N server nodes at the second moment; receiving, by the terminal device at a fourth moment between the second moment and a third moment, the response information fed back by the one server node; waiting for, by the terminal device, a first preset duration starting from the fourth moment, where the first preset duration is less than a time difference between the fourth moment and the third moment; and if the terminal device receives, within the first preset duration, response information fed back by the another server node, establishing, by the terminal device, a connection to the another server node.

In this embodiment of this application, an example in which the one server node is a server node 1 and the another server node is a server node 2 is used. The terminal device sends a connection request to a server node at a specific time interval (the terminal device first sends a connection request to the server node 1, and then sends a connection request to the server node 2 after a time interval T). For example, the terminal device first sends the connection request to the server node 1. If the terminal device receives, within the first preset duration T, response information fed back by the server node 1, the terminal device does not need to send a connection request to another server node. This helps save resources. In addition, after the terminal device sends the connection request to the server node 2, assuming that the terminal device first receives the response information fed back by the server node 1, the terminal device may wait for a period of time. If the terminal device receives, within this period of time, response information fed back by the server node 2, it indicates that the server node 2 responds comparatively quickly, and therefore the terminal device can establish a connection to the server node 2. In this manner, the terminal device can select, from the server node 1 and the server node 2, a server node that responds comparatively quickly, to establish a connection. This helps reduce a delay.

In a possible implementation, a time difference between the first moment and the second moment is a first duration T, and a time difference between the second moment and the third moment is the first duration T.

In a possible implementation, the terminal device sends a network resource request to the another server node, where the network resource request is used to request a network resource; and if the terminal device does not receive, within second preset duration, the network resource fed back by the another server node, the terminal device sends a network resource request to the one server node.

According to a third aspect, an embodiment of this application provides a server node selection method, and the method is applied to a terminal device. The method includes: sending, by the terminal device, a domain name resolution request to a DNS server, where the domain name resolution request carries a domain name, and the domain name resolution request is used to request an IP address corresponding to the domain name; receiving, by the terminal device, N IP addresses fed back by the DNS server, where each of the N IP addresses corresponds to one server node, and N is greater than or equal to 2; sending, by the terminal device, a connection request to one server node in the N server nodes at a first moment; and if the terminal device receives, before a second moment, response information fed back by the one server node, establishing, by the terminal device, a connection to the one server node; or if the terminal device does not receive, before a second moment, response information fed back by the one server node, sending, by the terminal device, a connection request to another server node in the N server nodes at the second moment.

If the terminal device simultaneously receives two pieces of response information fed back by the one server node and the another server node, the terminal device establishes a connection to a server node corresponding to first response information in the two pieces of response information.

In this embodiment of this application, an example in which the one server node is a server node 1 and the another server node is a server node 2 is used. The terminal device sends a connection request to a server node at a specific time interval (the terminal device first sends a connection request to the server node 1, and then sends a connection request to the server node 2 after a time interval T). For example, the terminal device first sends the connection request to the server node 1. If the terminal device receives, within a first preset duration T, response information fed back by the server node 1, the terminal device does not need to send a connection request to another server node. This helps save resources. In addition, after the terminal device sends the connection request to the server node 2, the terminal device simultaneously receives the response information fed back by the server node 1 and response information fed back by the server node 2, and it is considered that network quality of the two server nodes is acceptable. Therefore, the terminal device only needs to establish the connection to the server node corresponding to the first response information in the two pieces of response information. This manner helps reduce a delay of establishing a connection between the terminal device and a server node.

In a possible implementation, the establishing, by the terminal device, a connection to a server node corresponding to first response information in the two pieces of response information includes: if the terminal device first processes the first response information in the two pieces of response information, establishing, by the terminal device, the connection to the server node that sends the first response information.

In this embodiment of this application, when the terminal device simultaneously receives the response information fed back by the server node 1 and the response information fed back by the server node 2, the terminal device establishes a connection to a server node corresponding to response information that is processed first. This manner helps reduce a delay of establishing a connection between the terminal device and a server node.

In a possible implementation, the establishing, by the terminal device, a connection to a server node corresponding to first response information in the two pieces of response information includes: determining, by the terminal device, that a response time of the server node that sends the first response information is less than a response time of a server node that sends the second response information; and establishing, by the terminal device, the connection to the server node that sends the first response information.

In this embodiment of this application, when the terminal device simultaneously receives response information fed back by two server nodes, the terminal device establishes a connection to a server node that responds comparatively quickly. This manner helps reduce a delay of establishing a connection between the terminal device and a server node.

In a possible implementation, the terminal device sends a network resource request to the server node that sends the first response information, where the network resource request is used to request a network resource; and if the terminal device does not receive, within second preset duration, the network resource fed back by the server node that sends the first response information, the terminal device sends a network resource request to the server node that sends the second response information.

According to a fourth aspect, an embodiment of this application provides a terminal device, including a processor and a memory. The memory is configured to store one or more computer programs. When the one or more computer programs stored in the memory are executed by the processor, the terminal device is enabled to implement the method in the first aspect or any possible implementation of the first aspect. Alternatively, when the one or more computer programs stored in the memory are executed by the processor, the terminal device is enabled to implement the method in the second aspect or any possible implementation of the second aspect. Alternatively, when the one or more computer programs stored in the memory are executed by the processor, the terminal device is enabled to implement the method in the third aspect or any possible implementation of the third aspect.

According to a fifth aspect, an embodiment of this application further provides a terminal device. The terminal device includes modules/units for performing the method in the first aspect or any possible implementation of the first aspect; or the terminal device includes modules/units for performing the method in the second aspect or any possible implementation of the second aspect; or the terminal device includes modules/units for performing the method in the third aspect or any possible implementation of the third aspect. These modules/units may be implemented by hardware, or may be implemented by hardware executing corresponding software.

According to a sixth aspect, an embodiment of this application further provides a computer-readable storage medium. The computer-readable storage medium includes a computer program. When the computer program is run on a terminal device, the terminal device is enabled to perform the method in the first aspect or any possible implementation of the first aspect. Alternatively, when the computer program is run on a terminal device, the terminal device is enabled to perform the method in the second aspect or any possible implementation of the second aspect. Alternatively, when the computer program is run on a terminal device, the terminal device is enabled to perform the method in the third aspect or any possible implementation of the third aspect.

According to a seventh aspect, an embodiment of this application further provides a computer program product. When the computer program product is run on a terminal device, the terminal device is enabled to perform the method in the first aspect or any possible implementation of the first aspect. Alternatively, when the computer program product is run on a terminal device, the terminal device is enabled to perform the method in the second aspect or any possible implementation of the second aspect. Alternatively, when the computer program product is run on a terminal device, the terminal device is enabled to perform the method in the third aspect or any possible implementation of the third aspect.

DESCRIPTION OF EMBODIMENTS

Figure 1:
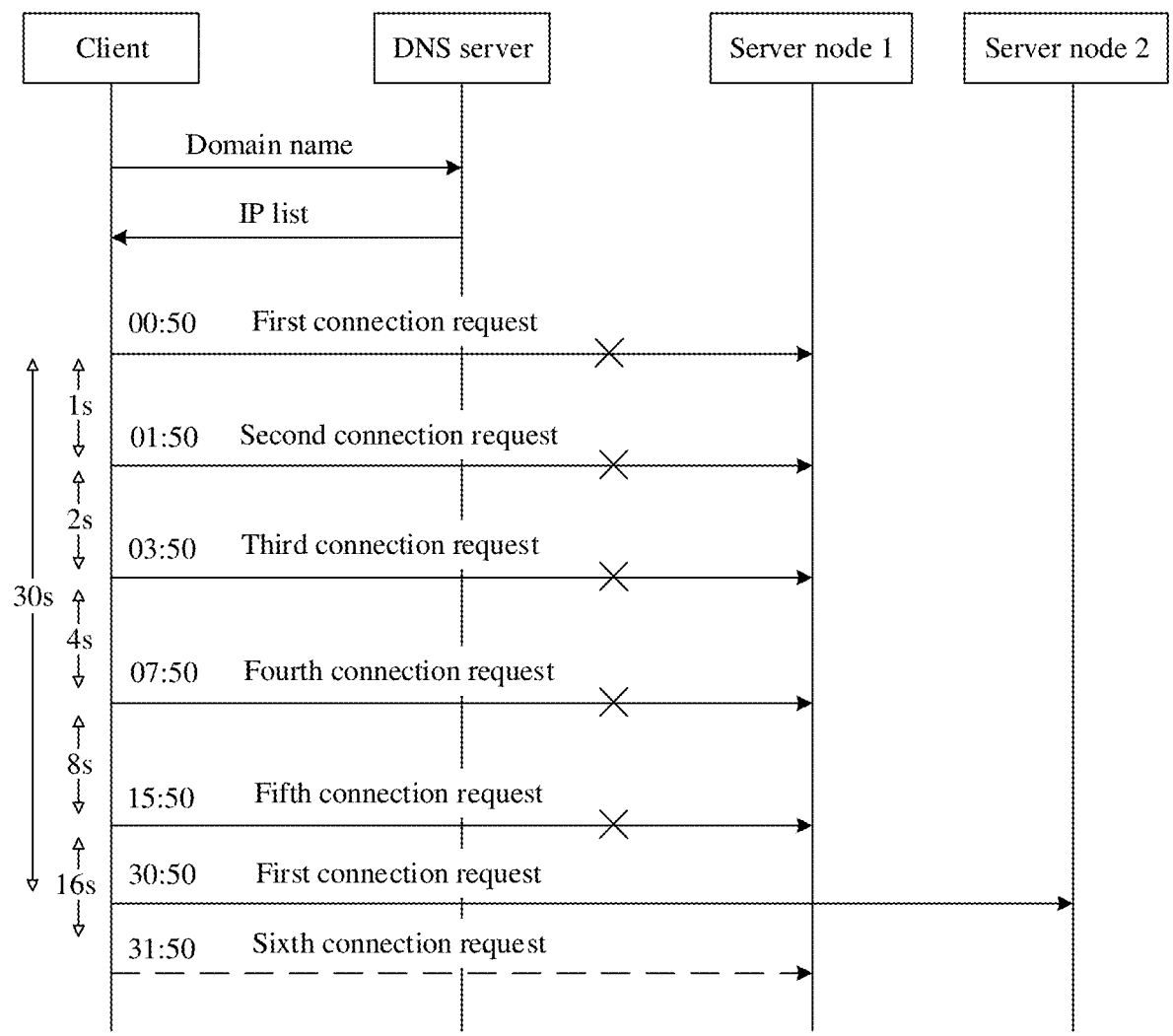
FIG. 1 is a schematic diagram of a server node selection process in the prior art.

The following describes the technical solutions in the embodiments of this application with reference to the accompanying drawings in the embodiments of this application.

The following describes some terms in this application, to facilitate understanding of a person skilled in the art.

A client in the embodiments of this application may be a software or hardware module that requests a network resource. For example, if a terminal device is a mobile phone, the client may be an application (app for short) in the mobile phone, such as Baidu or Sohu. Baidu is used as an example. Baidu may be used to request a network resource such as a video, a picture, or a text.

A DNS query request device in the embodiments of this application may be a software or hardware module that sends a domain name resolution request to a DNS server. The domain name resolution request includes a domain name, and the domain name resolution request is used to request the DNS to determine an IP address corresponding to the domain name. For example, if the terminal device is a mobile phone, the DNS query request device may be a software or hardware module in the mobile phone.

It should be noted that an example in which the DNS query request device is a software module in a mobile phone is used. The software module may be integrated into the foregoing client, in other words, an app, or may be integrated into an operating system (for example, Android) in the mobile phone. If the DNS query request device is integrated into the operating system in the mobile phone, such as the Android operating system, the DNS query request device may be Okhttp in the mobile phone. An example in which the DNS query request device is Okhttp in the mobile phone is used for description below.

An application in the embodiments of this application is a computer program that completes one or more specific operations. A mobile phone is used as an example. When running an application, the mobile phone may display a display interface of the application, so that man-machine interaction can be implemented in the display interface.

Usually, one application can implement a specific function. For example, applications include Baidu, Sohu, various mailbox applications, WeChat, Tencent chat software (QQ), WhatsApp Messenger, Line, a photo sharing application (instagram), Kakao Talk, and DingTalk.

The DNS server in the embodiments of this application stores a correspondence between a domain name and an IP address, and is configured to query, based on a domain name, an IP address corresponding to the domain name. The DNS server may alternatively have another name, for example, a domain name system, a domain name resolution server, or a domain name resolution system. In other words, a name of the DNS server is not limited in the embodiments of the present disclosure.

A uniform resource locator (URL) in the embodiments of this application may be used to request a network resource. Generally, the URL includes a domain name. For example, if the URL is www.baidu.com/?fr=mhd_card, the domain name is baidu.com; or if the URL is www.sina.com, the domain name is sina.com.

For a server node in the embodiments of this application, an ICP may usually deploy server nodes at different locations. The ICP may store network resources in different server nodes in a distributed manner, and the terminal device may access the network resources from the server nodes.

In the embodiments of this application, the server node may alternatively have another name, for example, a node server, an application server, a node device, or a node. This is not limited in the embodiments of the present disclosure, provided that the foregoing meaning can be expressed.

The ICP in the embodiments of this application is an internet content provider for providing a specific network resource, for example, Jingdong, Amazon, Baidu, or Sina. The internet content provider may alternatively have another name, for example, a content service provider, or a network content provider. In other words, a name of the content server is not limited in the embodiments of the present disclosure, provided that the foregoing meaning can be expressed.

An internet service provider (ISP) in the embodiments of this application is an operator that provides an internet access service for the terminal device. In other words, the terminal device accesses a network resource in the ICP by using the ISP. The ISP may be China Telecom, China Unicom, China Mobile, Great Wall Broadband Network, or the like.

For example, the ISP is China Telecom, and the ICP is Baidu. Usually, China Telecom deploys different server nodes at different locations, and Baidu can purchase the server nodes deployed by China Telecom at all the locations. For example, China Telecom deploys three server nodes in Guangzhou, Shenzhen, and Dongguan. If Baidu purchases the three server nodes, the client may access, by using the three server nodes, network resources provided by Baidu.

The network resource in the embodiments of this application includes a video, a picture, a text, or the like. Different ICPs provide different network resources. For example, Youku is an ICP that provides video resources.

"At least one" in the present disclosure means one or more. "A plurality of" in the present disclosure means two or more than two.

In addition, it should be understood that, in the present disclosure, terms such as "first" and "second" are merely used for differentiation, but should not be understood as an indication or implication of relative importance or an indication or implication of an order.

Example embodiments provide a server node selection method. In the method, after a client receives an IP address list fed back by a DNS server, the client sends connection requests to server nodes corresponding to different IP addresses in the IP address list (there may be different implementations, which are described below). The client establishes a connection to a server node from which the client first receives response information fed back by the server node. Generally, if the client first receives response information fed back by a specific server node, it indicates that network quality of the server node is comparatively good. Therefore, according to the server node selection method provided in the embodiments of this application, a server node with comparatively good network quality can be selected from a plurality of server nodes.

Figure 2:
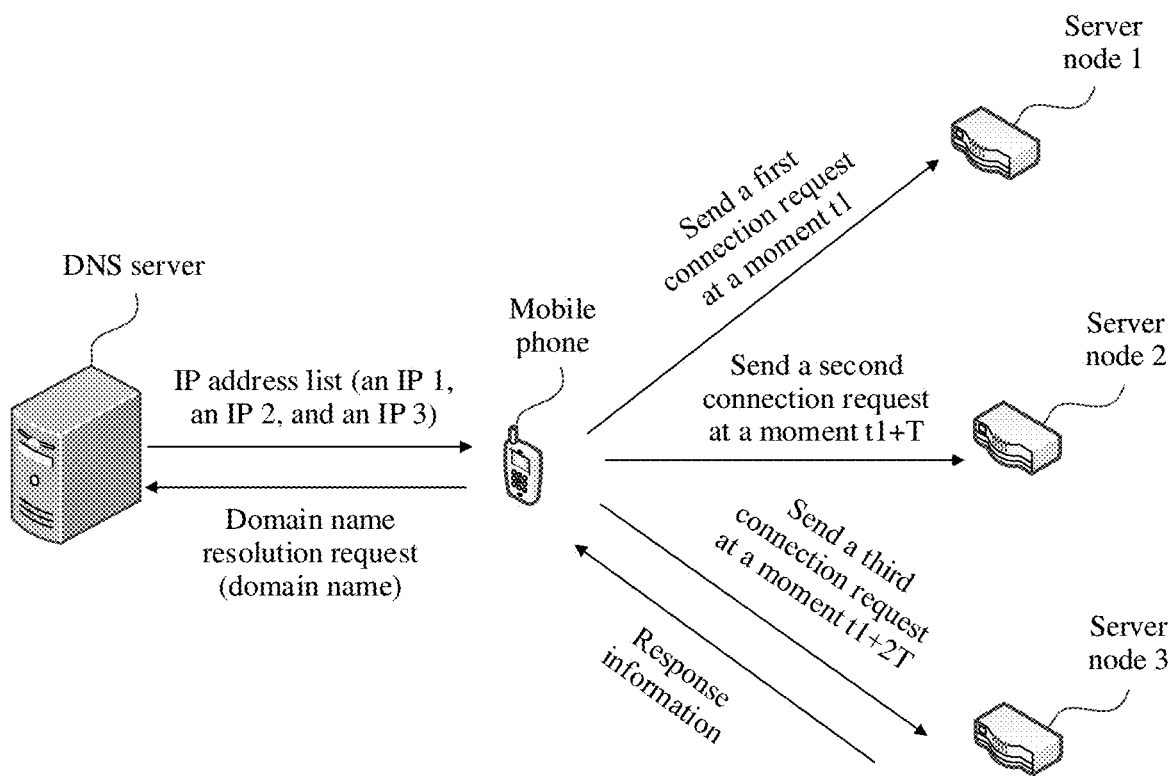
FIG. 2 is a schematic diagram of an application scenario according to an example embodiment.

FIG. 2 is a schematic diagram of an application scenario according to an embodiment of this application. As shown in FIG. 2, the application scenario includes a mobile phone, a DNS server, and at least one server node. In FIG. 2, three server nodes are used as an example.

As shown in FIG. 2, the mobile phone sends a domain name resolution request to the DNS server, and the domain name resolution request carries a domain name. After receiving the domain name resolution request, the DNS server determines, based on the domain name, one or more IP addresses corresponding to the domain name, and generates an IP address list. For example, the IP address list includes three IP addresses, and each IP address corresponds to one server node (for example, an IP 1 corresponds to a server node 1, an IP 2 corresponds to a server node 2, and an IP 3 corresponds to a server node 3). The DNS server sends the IP address list to the mobile phone.

After receiving the IP address list, the mobile phone sends connection requests to the three server nodes. In a first possible implementation, the mobile phone sends a connection request to the server node 1 at a moment t1, sends a connection request to the server node 2 at a moment t1+T, and sends a connection request to the server node 3 at a moment t1+2T. In a second possible implementation, the mobile phone simultaneously sends the connection requests (not shown in FIG. 2) to the server node 1, the server node 2, and the server node 3.

The mobile phone establishes a connection to a server node from which the mobile phone first receives response information fed back by the server node. When a next interval T expires, the mobile phone does not send a connection request to another server node. For example, if the mobile phone first receives response information sent by the server node 3, the mobile phone establishes a connection to the server node 3. If the IP address list further includes an IP 4 and the IP 4 corresponds to a server node 4, the client does not send a connection request to the server node 4 at a moment t1+3T. Generally, if the mobile phone first receives a specific server node, it indicates that network quality of the server node is comparatively good. Therefore, according to the server node selection method provided in the embodiments of this application, a server node with comparatively good network quality can be selected from a plurality of server nodes.

Figure 3:
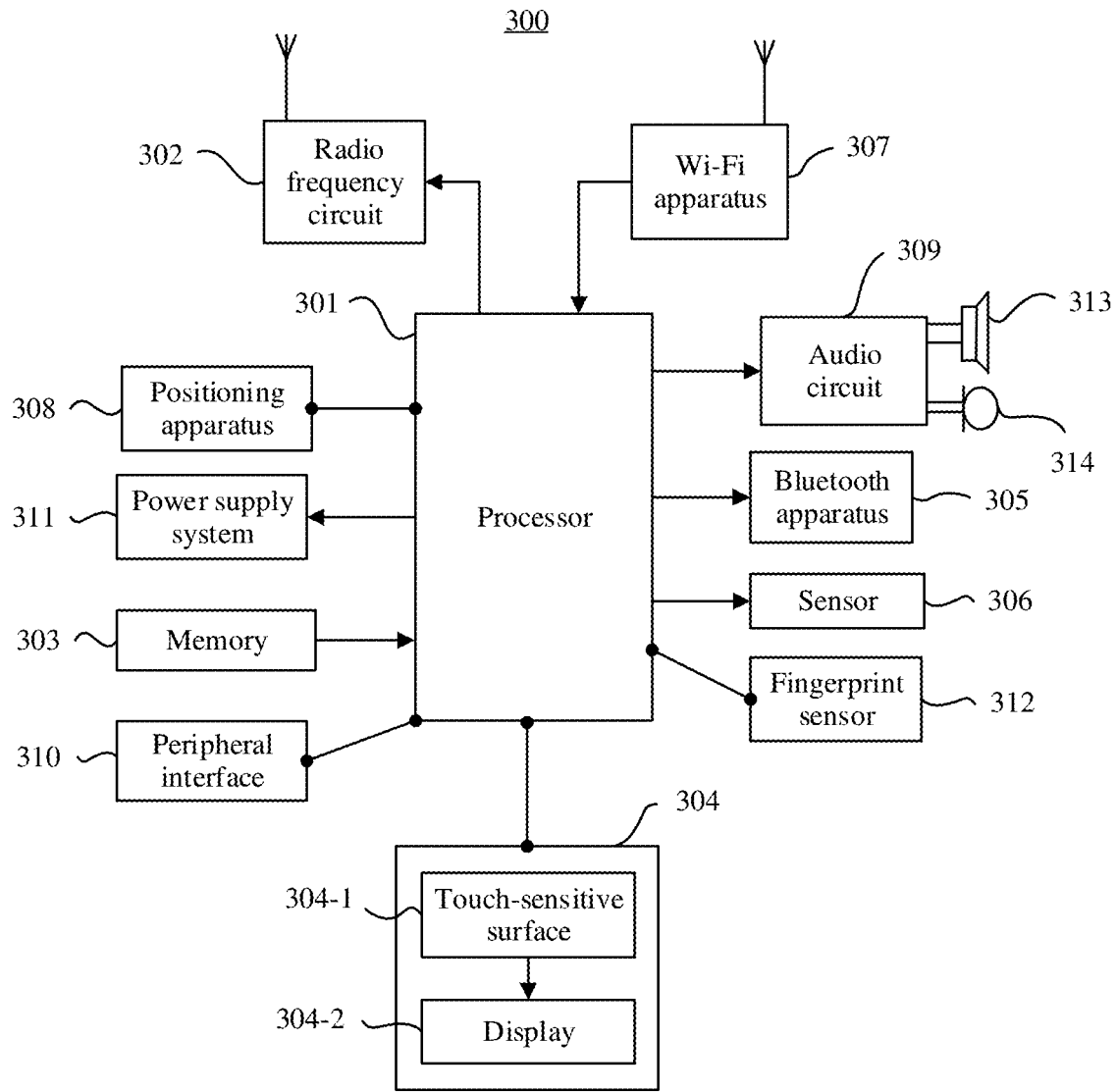
FIG. 3 is a schematic diagram of a hardware structure of a mobile phone according to an example embodiment.

To describe the technical solutions in the embodiments of this application more clearly, the following describes a diagram of a hardware structure of a mobile phone in the application scenario shown in FIG. 2. FIG. 3 is a schematic diagram of a hardware structure of a mobile phone 300 according to an embodiment of this application. It should be understood that the mobile phone 300 shown in FIG. 3 is only an example, and the mobile phone 300 may include more or fewer components than those shown in the figure, or combine two or more components, or have different component configurations. Various components shown in FIG. 3 may be implemented in hardware that includes one or more signal processing and/or application-specific integrated circuits, in software, or in a combination of hardware and software.

As shown in FIG. 3, the mobile phone 300 may specifically include components such as one or more processors 301, a radio frequency (RF) circuit 302, a memory 303, a touchscreen 304, a Bluetooth apparatus 305, one or more sensors 306, a Wi-Fi apparatus 307, a positioning apparatus 308, an audio circuit 309, a peripheral interface 310, and a power supply system 311. These components may communicate with each other by using one or more communications buses or signal cables (not shown in FIG. 3). A person skilled in the art may understand that the hardware structure shown in FIG. 3 does not constitute a limitation on the mobile phone 300, and the mobile phone 300 may include more or fewer components than those shown in the figure, or combine some components, or have different component arrangements.

The following describes in detail all the components of the mobile phone 300 with reference to FIG. 3.

The processor 301 is a control center of the mobile phone 300. The processor 301 is connected to all parts of the mobile phone 300 by using various interfaces and lines, and performs various functions of the mobile phone 300 and data processing by running or executing an application stored in the memory 303 and invoking data and instructions stored in the memory 303. In some embodiments, the processor 301 may include one or more processing units. The processor 301 may include an application processor (AP), a modem processor, and the like. Different processing units included in the processor 301 may be independent devices, or may be integrated into one processor. For example, the processor 301 integrates an application processor and a modem processor. The application processor mainly processes an operating system, a user interface, an application, and the like. The modem processor mainly processes wireless communication. It can be understood that the modem processor may not be integrated into the processor 301.

The radio frequency circuit 302 may be configured to receive and send a radio signal in an information receiving and sending process or in a call process. Specifically, after receiving downlink data from a base station, the radio frequency circuit 302 may send the downlink data to the processor 301 for processing, and sends related uplink data to the base station. Generally, the radio frequency circuit includes but is not limited to an antenna, at least one amplifier, a transceiver, a coupler, a low noise amplifier, a duplexer, and the like. In addition, the radio frequency circuit 302 may further communicate with another device through wireless communication. The wireless communication may use any communication standard or protocol, including but not limited to a global system for mobile communications, a general packet radio service, code division multiple access, wideband code division multiple access, long term evolution, an email, a short message service, and the like.

The memory 303 is configured to store the application program and the data. The processor 301 performs various functions of the mobile phone 300 and data processing by running the application and the data that are stored in the memory 303. The memory 303 mainly includes a program storage area and a data storage area. The program storage area may store an operating system, and an application required by at least one function (for example, a sound play function or an image play function). The data storage area may store data (for example, audio data or a phone book) created when the mobile phone 300 is used. In addition, the memory 303 may include a high-speed random access memory, or may include a nonvolatile memory such as a magnetic disk storage device, a flash memory device, or another nonvolatile solid-state storage device. The memory 303 may store various operating systems, for example, an iOS operating system developed by Apple and an Android operating system developed by Google. For example, the memory 303 stores an application related to the embodiments of this application, such as Taskcard Store, Twitter, Contacts, or Weibo.

The touchscreen 304 may include a touch-sensitive surface 304-1 and a display 304-2. The touch-sensitive surface 304-1 (for example, a touch panel) may collect a touch event performed by a user of the mobile phone 300 on or near the touch-sensitive surface 304-1 (for example, an operation performed by the user on the touch-sensitive surface 304-1 or near the touch-sensitive surface 304-1 by using any proper object such as a finger or a stylus), and send collected touch information to another component, for example, the processor 301. The display 304-2 may be configured to display information entered by the user or information provided for the user, and various menus of the mobile phone 300. The display 304-2 may be configured in a form of a liquid crystal display, an organic light-emitting diode, or the like. The touch-sensitive surface 304-1 may cover the display 304-2. After detecting the touch event performed on or near the touch-sensitive surface 304-1, the touch-sensitive surface 304-1 sends the touch event to the processor 301 to determine a type of the touch event, and then the processor 301 may provide a corresponding visual output on the display 304-2 based on the type of the touch event. In FIG. 3, the touch-sensitive surface 304-1 and the display 304-2 are used as two independent components to implement input and output functions of the mobile phone 300. However, in some embodiments, the touch-sensitive surface 304-1 and the display 304-2 may be integrated to implement the input and output functions of the mobile phone 300.

The mobile phone 300 may further include the Bluetooth apparatus 305, configured to implement data exchange between the mobile phone 300 and another short-distance device (for example, a mobile phone or a smartwatch). In this embodiment of this application, the Bluetooth apparatus may be an integrated circuit, a Bluetooth chip, or the like.

The mobile phone 300 may further include the at least one sensor 306, such as a light sensor, a motion sensor, and another sensor. Specifically, the light sensor may include an ambient light sensor and a proximity sensor. The ambient light sensor may adjust luminance of the display of the touchscreen 304 based on ambient light luminance. The proximity sensor may power off the display when the mobile phone 300 approaches an ear.

In some embodiments of this application, the mobile phone 300 may further include a fingerprint sensor 312. For example, the fingerprint sensor 312 may be disposed on a rear side of the mobile phone 300 (for example, below a rear-facing camera), or the fingerprint sensor 312 may be disposed on a front side of the mobile phone 300 (for example, below the touchscreen 304). In this embodiment of this application, any type of sensing technology may be used for the fingerprint sensor 312, including but not limited to an optical sensing technology, a capacitive sensing technology, a piezoelectric sensing technology, an ultrasonic sensing technology, and the like.

The mobile phone 300 may be further provided with another sensor such as a gyroscope, a barometer, a hygrometer, a thermometer, or an infrared sensor. Details are not described herein.

The Wi-Fi apparatus 307 is configured to provide the mobile phone 300 with network access that conforms to a Wi-Fi related standard protocol. The mobile phone 300 may access a Wi-Fi access point by using the Wi-Fi apparatus 307, to help the user to receive and send an email, browse a web page, access streaming media, and the like. The Wi-Fi apparatus 307 provides wireless broadband internet access for the user. In some other embodiments, the Wi-Fi apparatus 307 may alternatively serve as a Wi-Fi wireless access point, and may provide Wi-Fi network access for another electronic device.

The positioning apparatus 308 is configured to provide a geographical location for the mobile phone 300. It can be understood that the positioning apparatus 308 may be specifically a receiver of a positioning system, such as a global positioning system (GPS) or a BeiDou navigation satellite system.

The audio circuit 309, a speaker 313, and a microphone 314 may provide an audio interface between the user and the mobile phone 300. The audio circuit 309 may convert received audio data into an electrical signal and then transmit the electrical signal to the speaker 313, and the speaker 313 converts the electrical signal into a sound signal for output. In addition, the microphone 314 converts a collected sound signal into an electrical signal. The audio circuit 309 receives the electrical signal, converts the electrical signal into audio data, and then outputs the audio data to the RF circuit 302, to send the audio data to, for example, another mobile phone, or outputs the audio data to the memory 303 for further processing.

The peripheral interface 310 is configured to provide various interfaces for an external input/output device (for example, a keyboard, a mouse, an external display, an external memory, or a subscriber identity module card). For example, a mouse is connected by using a universal serial bus interface, and a subscriber identity module (SIM) card provided by a telecommunications operator is connected by using a metal contact in a subscriber identity module card slot. The peripheral interface 310 may be configured to couple the external input/output peripheral device to the processor 301 and the memory 303.

The mobile phone 300 may further include the power supply system 311 (for example, a battery and a power management chip) that supplies power to the components. The battery may be logically connected to the processor 301 by using the power management chip, to implement functions such as charging and discharging management and power consumption management by using the power supply system 311.

Behavior of a client in the following embodiments may be implemented in a mobile phone of the foregoing hardware structure.

Figure 4:
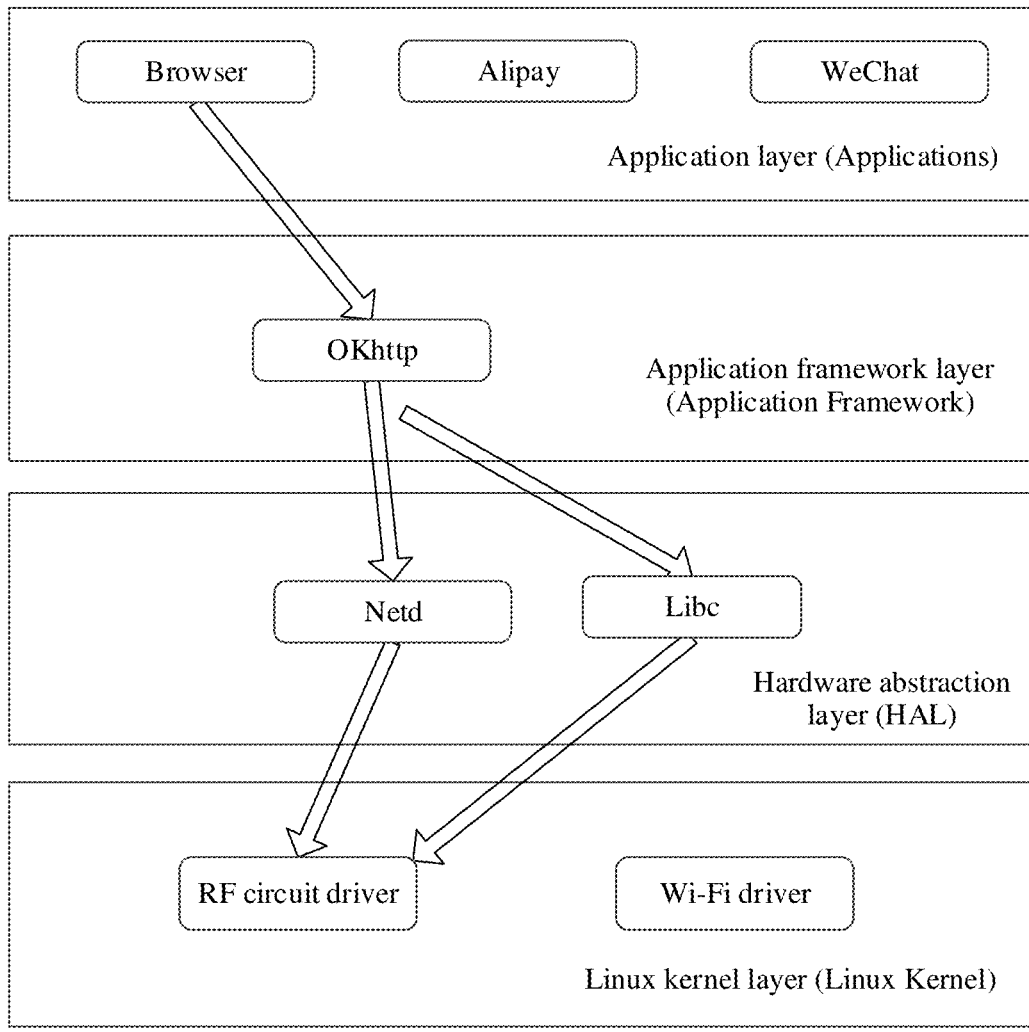
FIG. 4 is a schematic diagram of a software structure of a mobile phone according to an example embodiment.

FIG. 4 is a diagram of a software architecture of the mobile phone 300 according to an embodiment of this application. In FIG. 4, an example in which the mobile phone 300 is an Android operating system is used. As shown in FIG. 4, the software architecture of the mobile phone 300 includes four layers: a kernel layer, a hardware abstraction layer, an application framework layer, and an application layer (applications layer). Certainly, in the software architecture shown in FIG. 4, a system runtime library layer (libraries layer) (not shown in FIG. 4) may further be included between the kernel layer and the application framework layer. The system runtime library layer supports an upper layer, in other words, the framework layer. When the framework layer is used, the Android operating system runs a C/C++ library included in the system runtime library layer, to implement a function to be implemented by the framework layer.

The application layer includes various applications, for example, a web browser and an instant messaging application (such as WeChat or QQ). A web browser is used as an example. The user taps an icon of the browser by using the touch-sensitive surface 304-1 of the mobile phone 300, to trigger the processor 301 to start the browser. The display 304-2 displays a display interface of the browser. The user enters a website (for example, http//www.baidu.com) in the display interface by using the touch-sensitive surface 304-1.

The application framework layer (referred to as a framework layer below) includes OKhttp, and OKhttp is used to encapsulate a website by using a transmission protocol. The transmission protocol includes a transmission control protocol (TCP), an internet protocol (IP), and the like.

The hardware abstraction layer includes a network daemon (Netd) and a library function (Libc for short). Netd is used to connect the kernel layer and the framework layer. Netd may be configured to store information about a DNS server, an IP address of a server node, and the like, and may be further configured to trigger an RF circuit driver at the kernel layer.

The kernel layer includes drivers of input/output devices (such as a keyboard, a touchscreen, a headset, a speaker, a microphone, and an RF circuit).

In some embodiments of this application, an app at the application layer in the mobile phone 300 shown in FIG. 4 may be a client (a browser is used as an example below). OKhttp may be the foregoing DNS query request device. Alternatively, OKhttp, Netd, and Libc together constitute the foregoing DNS query request device. To be specific, OKhttp completes processes such as DNS resolution request sending, IP address receiving, and server node selection and connection with the assistance of Netd and Libc. The following describes a process of implementing, by using the mobile phone shown in FIG. 3 and FIG. 4, a server node selection method provided in the embodiments of this application.

It should be understood that FIG. 3 shows the hardware architecture of the mobile phone 300 according to the embodiment of this application, and FIG. 4 shows the software architecture of the mobile phone 300 according to the embodiment of this application. Therefore, a software program and/or module corresponding to the software architecture in FIG. 4 may be stored in the memory 303, and the processor 301 runs the software program and/or module stored in the memory 303, to perform the following process:

(1) A browser at the application layer is used as an example. The browser sends, to OKhttp at the framework layer, a website, in other words, a URL, entered by the user (the foregoing content has described the process in which a user enters a website in a display interface of a browser, and details are not described herein again). After receiving the website sent by the browser, OKhttp extracts a domain name from the website, and OKhttp sends the extracted domain name to Netd.

(2) After receiving the domain name, Netd obtains a domain name resolution request based on a DNS resolution command, and sends the domain name resolution request to the DNS server. For example, Netd invokes the RF circuit driver to start the RF circuit, and the RF circuit sends the domain name resolution request to the DNS server. For example, Netd may store the information about the DNS server. For example, Netd stores geographical locations of a plurality of DNS servers. After receiving the domain name resolution request, Netd may determine a DNS server closest to a current geographical location of the mobile phone 300 from the plurality of DNS servers, and the RF circuit sends the domain name resolution request to the determined DNS server.

(3) After receiving an IP address list returned by the DNS server, the RF circuit returns the IP address list to Netd. Netd returns the IP address list to Okhttp. Okhttp generates a first handshake request. The first handshake request is used to request to establish a connection to a first server node, and an IP address of the first server node is a first IP address in the IP address list. Okhttp sends the first handshake request to Libc. Libc invokes the RF circuit driver to start the RF circuit. The RF circuit sends the first handshake request to the first server node.

(4) Okhttp starts timing. If Okhttp does not receive, within a first preset time, response information fed back by the first server node, Okhttp generates a second handshake request. The second handshake request is used to request to establish a connection to a second server node, and an IP address of the second server node is a second IP address in the IP address list. Okhttp sends the second handshake request to Libc. Libc invokes the RF circuit driver to start the RF circuit. The RF circuit sends the second handshake request to the second server node.

(5) Assuming that Okhttp first receives the response information fed back by the first server node, Okhttp sends a network resource request (for example, the network resource request may be extracted from the URL, and the network resource request may be /?fr=mhd_card if the URL is www.baidu.com/?fr=mhd_card) to the first server node. For example, Okhttp may invoke Libc, Libc invokes the RF circuit driver to start the RF circuit, the RF circuit sends the network resource request to the first server node, the RF circuit sends a network resource to Libc when receiving the network resource fed back by the first server node, Libc sends the network resource to Okhttp, and Okhttp sends the network resource to the browser.

An example in which the mobile phone 300 sends connection requests to the first server node and the second server node at a specific time interval is used in the foregoing steps (1) to (5). Actually, the mobile phone 300 may alternatively send connection requests to the first server node and the second server node simultaneously.

Details are not described herein.

Figure 5:
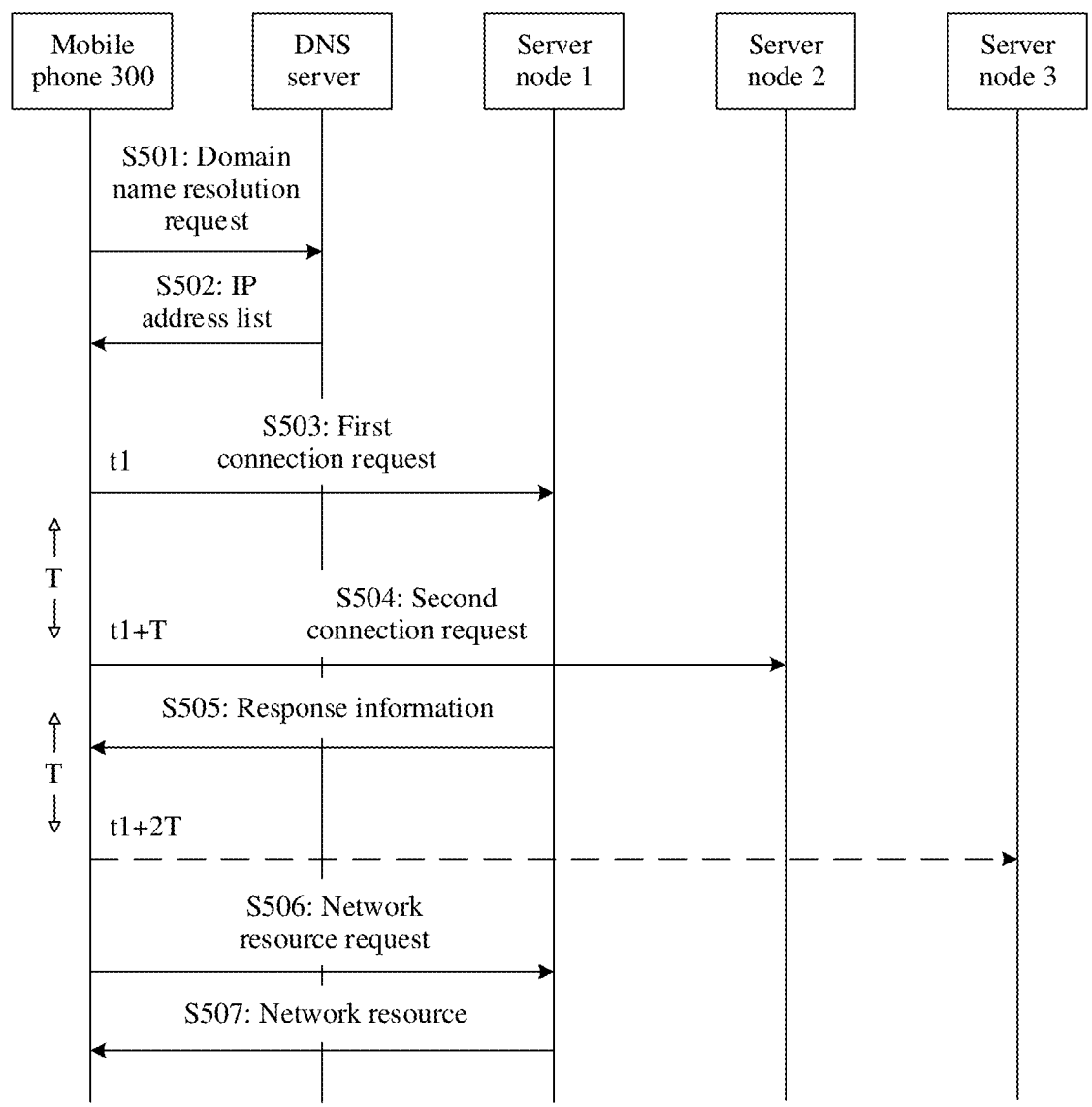
FIG. 5 is a schematic flowchart of a server node selection method according to an example embodiment.

FIG. 5 is a schematic flowchart of a server node selection method according to an embodiment of this application. The method is applied to the application scenario shown in FIG. 2. It should be noted that steps performed by the mobile phone 300 in FIG. 5 may be performed by a DNS query request device (for example, OKhttp in the mobile phone).

As shown in FIG. 5, the procedure includes the following steps.

S501: The mobile phone 300 sends a domain name resolution request to the DNS server, where the domain name resolution request carries a domain name, and the domain name resolution request is used to request to resolve an IP address corresponding to the domain name. Correspondingly, the DNS server receives the domain name resolution request sent by the mobile phone 300.

Before sending the domain name resolution request to the DNS, the mobile phone 300 may select one DNS server from a plurality of DNS servers, and send the domain name resolution request to the selected DNS server. A process in which the mobile phone 300 selects a DNS server and sends the domain name resolution request to the DNS server is described above, and details are not described herein again. Certainly, the mobile phone 300 may alternatively not select a DNS server, in other words, send the domain name resolution request to the DNS servers, receive IP address lists sent by the DNS servers, and integrate the IP address lists sent by the DNS servers into one IP address list, to perform a subsequent process.

Usually, one domain name corresponds to a relatively large quantity of IP addresses. Therefore, after determining a plurality of IP addresses based on a domain name, the DNS server may select some IP addresses from the plurality of IP addresses, and send the selected IP addresses to the mobile phone 300. For example, the DNS server may record current visits of a server node corresponding to each IP address, select a server node with fewer current visits from a plurality of server nodes, and send the selected server node to the mobile phone 300.

S502: The DNS server sends an IP address list to the mobile phone 300, where the IP address list includes one or more IP addresses, and the one or more IP addresses are IP addresses that are determined by the DNS server based on the domain name and that correspond to the domain name Correspondingly, the mobile phone 300 receives the IP address list sent by the DNS server.

For example, Table 1 shows a possible IP address list (Table 1 is merely an example, and does not limit the IP address list).

TABLE 1

| Server node | IP address | Domain name |
| --- | --- | --- |
| Server node 1 | 114.115.190.71 | baidu.com |
| Server node 2 | 114.171.121.50 | baidu.com |
| Server node 3 | 114.129.133.20 | baidu.com |

Actually, the DNS server may not send an IP address to the mobile phone 300 in a form of a table, but send the IP address in another manner. For example, the DNS server sends all IP addresses to the mobile phone 300 through packing. This is not limited in the embodiments of the present disclosure.

S503: The mobile phone 300 sends a first connection request to a first server node at a first moment t1, where the first connection request is used to request to establish a connection to the first server node, and the first server node is a server node corresponding to an IP address in the IP address list.

Table 1 is used as an example, and an example in which the first server node is the server node 1 in Table 1 is used. Usually, the mobile phone 300 may establish the connection to the first server node through a three-way handshake. A detailed process is as follows:

(1) First handshake: The mobile phone 300 sends a first handshake request to the first server node. The first handshake request carries a flag bit "SYN=1" and an initial sequence number "seq=x". The flag bit SYN is set to 1, and is used to indicate that the mobile phone 300 enters a SYN-sent state. The sequence number "seq=x" is randomly generated by the mobile phone 300, and is used in a subsequent handshake process.

(2) Second handshake: After receiving the first handshake request sent by the mobile phone 300, the first server node learns, from the flag bit "SYN=1" in the first handshake request, that the mobile phone 300 requests to establish the connection. If the first server node agrees to establish the connection, the first server node sends ACK information (for ease of description, the ACK information is referred to as a second handshake request below) to the mobile phone 300. The ACK message carries the flag bit "SYN=1", an acknowledgment number "ack=x+1", and a sequence number seq=y that is randomly generated. The flag bit "SYN=1" is used to indicate that the first server node enters a SYN-received state. The acknowledgment number is generated by the first server node based on "seq=x" in the first handshake request. The first server node randomly generates the value "seq=y", which is used in a subsequent handshake process.

(3) Third handshake: After receiving the ACK information (that is, the second handshake request) sent by the first server node, the mobile phone 300 sends acknowledgment information (for ease of description, the acknowledgment information is referred to as a third handshake request below) to the first server node. The acknowledgment information includes an acknowledgment number "ack=y+1" and a sequence number "seq=x+1". The mobile phone 300 enters an established state. After receiving the acknowledgment information, the first server node also enters an established state.

After the steps (1) to (3) are completed, the mobile phone 300 establishes the connection to the first server node. It can be learned that, in the process in which the mobile phone 300 establishes the connection to the first server node, the mobile phone 300 sends information to the first server node twice, that is, the first handshake request and the third handshake request.

Therefore, in this embodiment of this application, the first connection request sent by the mobile phone to the first server node at the first moment in S503 may be the first handshake request. If the first connection request is the first handshake request, response information fed back by the first server node may be response information for the first handshake request, that is, the ACK information (that is, the second handshake request) sent by the first server node to the mobile phone 300 in the second handshake process. In this case, after receiving the response information sent by the first server node, the mobile phone 300 may further send the third handshake request to the first server node, to complete the process in which the mobile phone 300 establishes the connection to the first server node, and then the mobile phone 300 sends a network resource request to the first server node to request a network resource.

S504: If the mobile phone 300 does not receive, within a first preset duration T, the response information fed back by the first server node, the mobile phone 300 sends a second connection request to a second server node at a second moment (a moment t 1+T). The second server node is a server node corresponding to another IP address in the IP address list.

Table 1 is used as an example. If the first server node is the server node 1, the second server node may be the server node 2 or the server node 3.

In this embodiment of this application, the mobile phone 300 sets the first preset duration T. A specific value of the first preset duration T is not limited in the embodiments of the present disclosure.

If the mobile phone 300 receives, within the first preset duration T, the response information fed back by the first server node, the mobile phone 300 establishes the connection to the first server node to request the network resource from the first server node, and does not send the second connection request to the second service node at the second moment.

S505: If the mobile phone 300 first receives, within the first preset time T after the second moment, the response information sent by the first server node, the mobile phone 300 establishes the connection to the first server node.

It should be noted that, it can be learned from the foregoing content that the first connection request may be the first handshake request. Therefore, the response information fed back by the first server node may be response information for the first handshake request, that is, the ACK information (that is, the second handshake request) sent by the first server node to the mobile phone 300 in the second handshake process. In this case, after receiving the response information sent by the first server node, the mobile phone 300 may further send the third handshake request to the first server node, to complete the process in which the mobile phone 300 establishes the connection to the first server node, and then the mobile phone 300 sends a network resource request to the first server node to request a network resource.

S506: The mobile phone 300 sends the network resource request to the first server node, where the network resource request is used to request a network resource.

S507: The mobile phone 300 receives the network resource returned by the first server node.

Baidu is used as an example. Baidu may store a network resource in each deployed server node, or may store a network resource in a cloud storage server. Therefore, after the first server node receives the network resource request sent by the mobile phone 300, if the first server node stores the network resource requested by the network resource request, the first server node sends the network resource to the mobile phone 300. If the first server node does not store the network resource requested by the network resource request, the first server node may obtain the network resource from the cloud storage server. After obtaining the network resource, the first server node sends the network resource to the mobile phone 300.

It can be learned from the foregoing description that, in this embodiment of this application, if there are a relatively large quantity of IP addresses in the IP address list (in other words, there are a relatively large quantity of server nodes), the mobile phone 300 may send the first connection request to the first server node at the first moment. If the mobile phone 300 receives, within the first preset duration T, the response information fed back by the first server node, the mobile phone 300 requests to establish the connection to the first server node to request the network resource, and does not send a connection request to another server node. If the mobile phone 300 does not receive, within the first preset duration T after the first moment, the response information fed back by the first server node, when the first preset duration expires, the mobile phone 300 sends the second connection request to the second server node at the second moment. If the mobile phone 300 receives, within the first preset duration T after the second moment, the response information fed back by the first server node or response information fed back by the second server node, the mobile phone 300 establishes a connection to a server node corresponding to earlier received response information, to request the network resource, and does not send a connection request to the other server node. If the mobile phone 300 does not receive, within the first preset duration after the second moment, the response information fed back by the first server node or response information fed back by the second server node, when the first preset duration after the second moment expires, the mobile phone 300 sends a third connection request to a third server node at a third moment, and so on. If the mobile phone 300 has sent a connection request to each server node once, but does not receive response information fed back by any server node, the mobile phone 300 may continue to send a connection request to the first server node, in other words, perform S503 again. Alternatively, the mobile phone 300 may perform S501 again, notify the DNS server that all server nodes in the IP address list fed back last time cannot be connected, and request the DNS server to send a new IP address list to the mobile phone 300.

It can be learned from the foregoing description that, in the solution of this embodiment of this application, after obtaining a plurality of IP addresses, the mobile phone 300 may not simultaneously send connection requests to server nodes corresponding to the plurality of IP addresses, but send connection requests to server nodes corresponding to different IP addresses at a specific interval. For example, the IP address list fed back by the DNS server includes three IP addresses. If the mobile phone 300 simultaneously sends connection requests to server nodes corresponding to the three IP addresses, a resource waste is caused for the mobile phone. For example, when sending a request to a server node corresponding to one IP address, the mobile phone needs to create one socket. In this case, when simultaneously sending the connection requests to the server nodes corresponding to the three IP addresses, the mobile phone needs to simultaneously create three sockets. However, in this embodiment of this application, the mobile phone first sends a connection request to the server node 1 at the first moment, in other words, the mobile phone first creates a socket. If the mobile phone 300 does not receive, within the first preset duration T, response information fed back by the server node 1, the mobile phone creates another socket, and sends a connection request to the server node 2 at the second moment. When the mobile phone first receives the feedback information from the server node 1 within the first preset duration after the second moment, the mobile phone establishes a connection to the server node 1. In this case, the mobile phone may disconnect the socket of the server node 2. It can be learned that the mobile phone does not need to simultaneously create respective sockets of the three server nodes, thereby saving resources. In addition, the mobile phone simultaneously sends the connection requests to the server nodes corresponding to the three IP addresses, and consequently a network load is increased, and a relatively large quantity of network resources are occupied in a short time. However, the mobile phone 300 sends connection requests to server nodes corresponding to different IP addresses at a specific interval, so that the connection requests are sent separately. Therefore, a network load is not increased within a period of time. In addition, the mobile phone 300 does not necessarily need to send connection requests to server nodes corresponding to all IP addresses. Therefore, few network resources are consumed, and an optimal server node can be quickly connected without increasing concurrent visits.

The following lists two examples to describe the server node selection method shown in FIG. 5.

Example 1

Figure 6:
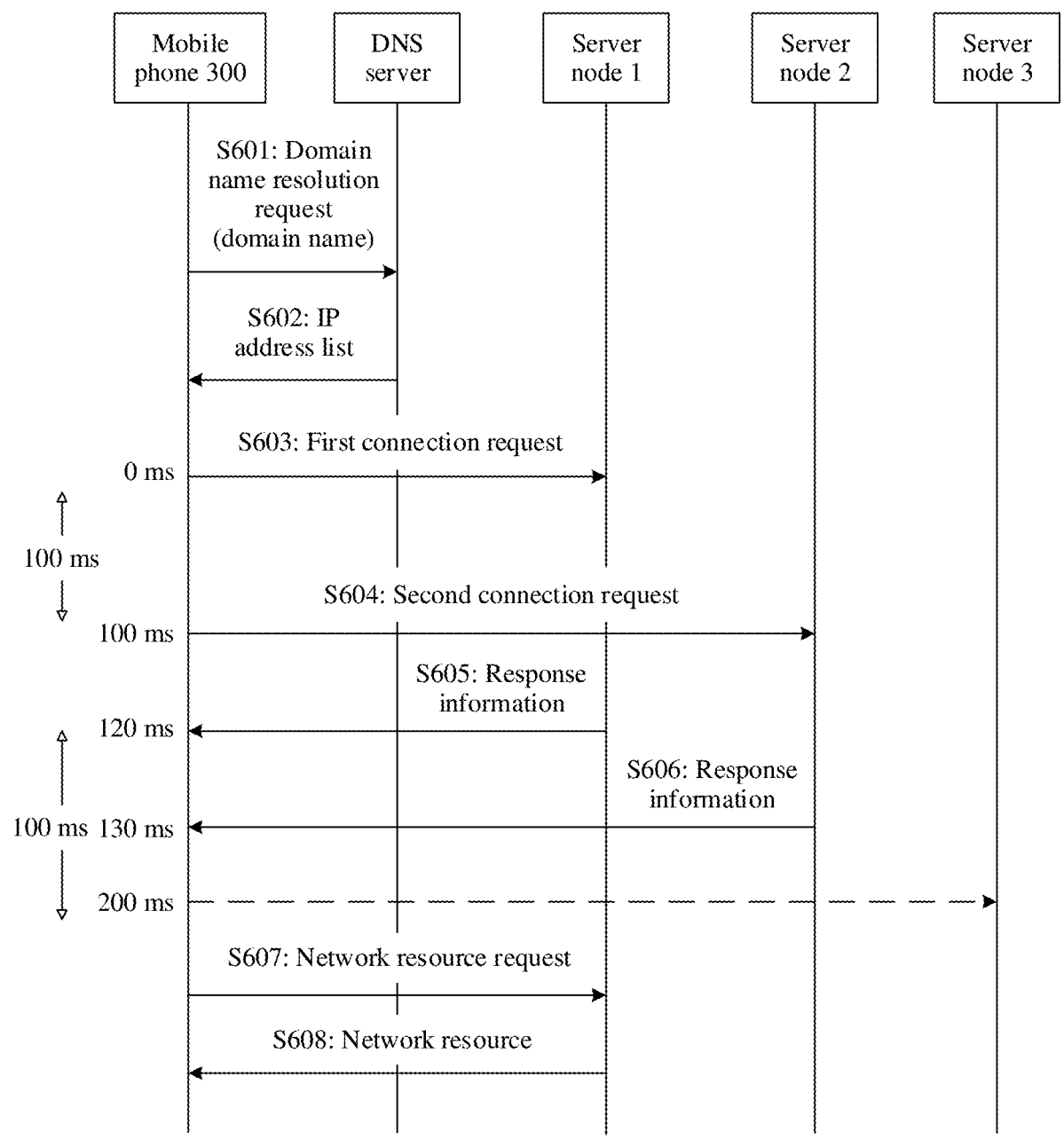
FIG. 6 is a schematic flowchart of a server node selection method according to an example embodiment.

FIG. 6 is a schematic flowchart of a routing selection method according to an embodiment of this application. In FIG. 6, the application scenario shown in FIG. 2 is used as an example, and an example in which t1 is 0 ms and T is 100 ms is used.

After the mobile phone 300 sends a domain name resolution request to the DNS server (S601), the DNS server obtains a domain name through resolution, to obtain an IP address list, and sends the IP address list to the mobile phone 300 (S602). The mobile phone 300 sends a first connection request to the server node 1 at a moment of 0 ms (S603). When the mobile phone 300 does not receive, within 100 ms, response information fed back by the server node 1, the mobile phone 300 sends a second connection request to the server node 2 at a moment of 100 ms (S604). The mobile phone 300 establishes a connection to a server node from which the mobile phone 300 first receives, within 100 ms after the mobile phone 300 sends the connection requests to the server node 1 and the server node 2, response information fed back by the server node.

Still referring to FIG. 6, the mobile phone 300 receives, at a moment of 120 ms, the response information fed back by the server node 1 (S605), but does not receive, before or at the moment of 120 ms, response information fed back by the server node 2. To be specific, the mobile phone 300 first receives the response information fed back by the server node 1, and therefore the mobile phone 300 establishes a connection to the server node 1.

It should be noted that, after receiving the response information fed back by the server node 1, the mobile phone 300 may subsequently receive the response information fed back by the server node 2. For example, if the mobile phone 300 subsequently receives the response information fed back by the server node 2, the mobile phone 300 may not respond to or may discard the response information fed back by the server node 2. Still referring to FIG. 6, the mobile phone 300 receives, at a moment of 130 ms, the response information fed back by the server node 2 (S606). Because the mobile phone 300 has established the connection to the server node 1, the mobile phone 300 may not respond to or may discard the response information fed back by the server node 2. For example, when the mobile phone 300 receives response information fed back by one server node, it may be determined whether the mobile phone 300 has established a connection to a specific server node. If the mobile phone 300 has established the connection to the specific server node, the mobile phone 300 may not respond to or may discard response information fed back by the one server node.

For another example, to save resources, after receiving the response information fed back by the server node 1, the mobile phone 300 may not receive the response information fed back by the server node 2. For example, the mobile phone 300 may disconnect a socket corresponding to the server node 2. It should be noted that, when the mobile phone 300 sends a connection request to the server node 1, the mobile phone 300 creates a socket between the mobile phone 300 and the server node 1, to send the connection request to the server node 1 by using the socket. This is similar to a process in which the mobile phone 300 sends a connection request to the server node 2. Therefore, after the mobile phone 300 receives the response information fed back by the server node 1, the mobile phone 300 may disconnect the socket corresponding to the server node 2, and does not receive the response information of the server node 2, thereby saving resources.

Still referring to FIG. 6, after the mobile phone 300 establishes the connection to the server node 1, the mobile phone 300 may request a network resource from the server node 1 (S607). The server node 1 feeds back the network resource to the mobile phone 300 (S608).

It should be noted that, in Example 1, the mobile phone 300 sends the connection request to the server node 1 at the moment of 0 ms, and receives, at a moment of 120 ms, the response information sent by the server node 1. In other words, a response time of the server node 1 is 120 ms. The mobile phone 300 sends the connection request to the server node 2 at the moment of 100 ms, and receives, at a moment of 130 ms, the response information sent by the server node 2. In other words, a response time of the server node 2 is 30 ms. It can be learned that, although the response time of the server node 2 is less than the response time of the server node 1, the mobile phone 300 still selects to connect to the server node 1. Because a server node whose response time ranges from T to 2T (100 ms to 200 ms) has comparatively good network quality, after the mobile phone 300 first receives the response information fed back by the server node 1, the mobile phone 300 considers that the server node 1 has comparatively good network quality. Therefore, the mobile phone 300 may directly establish the connection to the server node 1, and does not need to establish a connection to the server node 2 after waiting for 10 ms to receive the response information fed back by the server node 2, thereby saving 10 ms (for example, within 10 ms, the mobile phone 300 may complete a process of sending a network resource request to the server node 1).

In Example 1, because the mobile phone 300 has received, within 120 ms, the response information fed back by the server node 1, the mobile phone 300 does not need to send a third connection request (represented by a dashed line in the figure) to the server node 3 at a moment of 200 ms. If the mobile phone 300 does not receive, within 200 ms, the response information fed back by the server node 1 or the server node 2, the mobile phone 300 sends the connection request to the server node 3 at the moment of 200 ms. The mobile phone 300 establishes a connection to a server node from which the mobile phone 300 first receives, within 200 ms to 300 ms response information fed back by the server node.

Example 2

Figure 7:
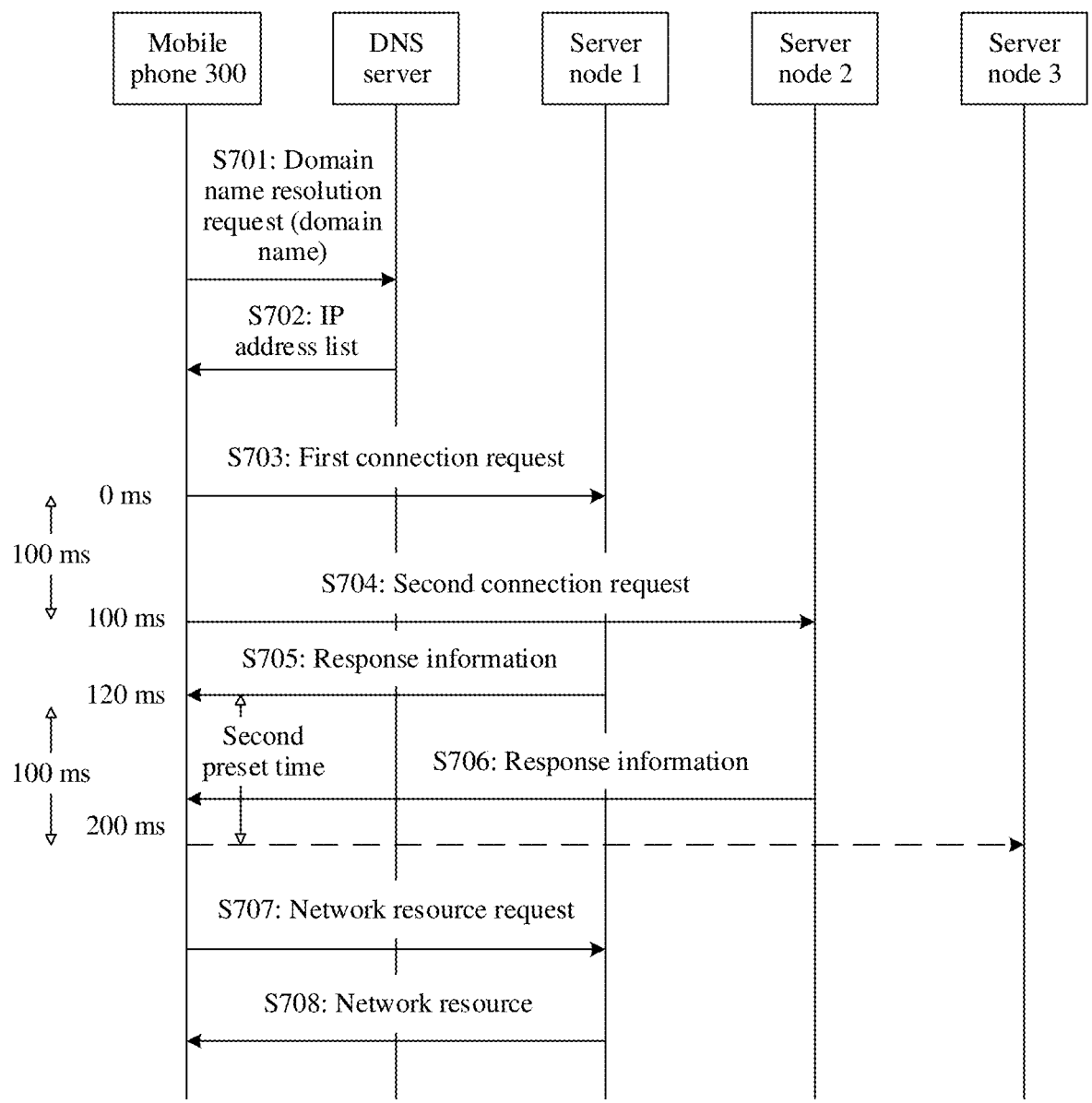
FIG. 7 is a schematic flowchart of a server node selection method according to an example embodiment.

FIG. 7 is a schematic flowchart of a server node selection method according to an embodiment of this application. In FIG. 7, the application scenario shown in FIG. 2 is used as an example, and an example in which t1 is 0 ms and T is 100 ms is used.

In Example 2, a process in which the mobile phone 300 sends connection requests to the server node 1 and the server node 2 (S701 to S704) is similar to that in Example 1 (S601 to S604). For brevity of this specification, details are not described herein again.

If the mobile phone 300 first receives, within T to 2T, response information fed back by the server node 1, the mobile phone 300 may not establish a connection to the server node 1 temporarily, but wait for second preset duration. As shown in FIG. 7, the mobile phone 300 receives, within 120 ms, the response information fed back by the server node 1 (S705), and the mobile phone 300 may not establish the connection to the server node 1 temporarily, but wait for the second preset duration. The second preset duration may be less than T.

For example, the second preset duration may be: T (duration in which the server node 1 feeds back the response information). When the mobile phone 300 receives, within 120 ms, the response information fed back by the server node 1, the mobile phone 300 may wait for duration of 80 ms. If the mobile phone 300 does not receive, before a moment of 200 ms, response information fed back by the server node 2, the mobile phone 300 establishes the connection to the server node 1. Alternatively, if the mobile phone 300 receives, before a moment of 200 ms, response information fed back by the server node 2 (S706), the mobile phone 300 establishes a connection to the server node 2 because a response time of the server node 2 is shorter (a response time of the server node 1 is 120 ms, and the response time of the server node 2 is less than 100 ms).

For another example, the second preset duration may alternatively be: T+a common duration in which a server node feeds back response information a duration in which the server node 1 feeds back the response information. Usually, a duration from a moment at which the mobile phone sends a connection request to a server node to a moment at which the mobile phone receives response information fed back by the server node is 40 ms to 50 ms. For example, a duration in which a server node feeds back response information is usually 50 ms. Because the mobile phone 300 sends a connection request to the server node 2 at a moment of 100 ms, there is a relatively high probability that the mobile phone 300 receives, within 150 ms, the response information fed back by the server node 2. Therefore, when the mobile phone 300 receives, within 120 ms, the response information fed back by the server node 1, the mobile phone 300 may wait for 30 ms. If the mobile phone 300 does not receive, before a moment of 150 ms, the response information fed back by the server node 2, the mobile phone 300 may establish the connection to the server node 1. If the mobile phone 300 receives, within 30 ms, the response information fed back by the server node 2, the mobile phone 300 establishes the connection to the server node 2 (because a response of the server node 2 is quicker than a response of the server node 1, where a response time of the server node 1 is 120 ms, and a response time of the server node 2 is 50 ms).

If the mobile phone 300 first receives, within T to 2T, the response request fed back by the server node 2, the mobile phone 300 may establish the connection to the server node 2, and does not need to wait for the second preset duration. Because the mobile phone 300 first sends the connection request to the server node 1 and then sends the connection request to the server node 2, when the mobile phone 300 first receives, within T to 2T, the response information fed back by the server node 2, in other words, when the server node 2 responds comparatively quickly, the mobile phone 300 may directly establish the connection to the server 2.

Example 3

Figure 8:
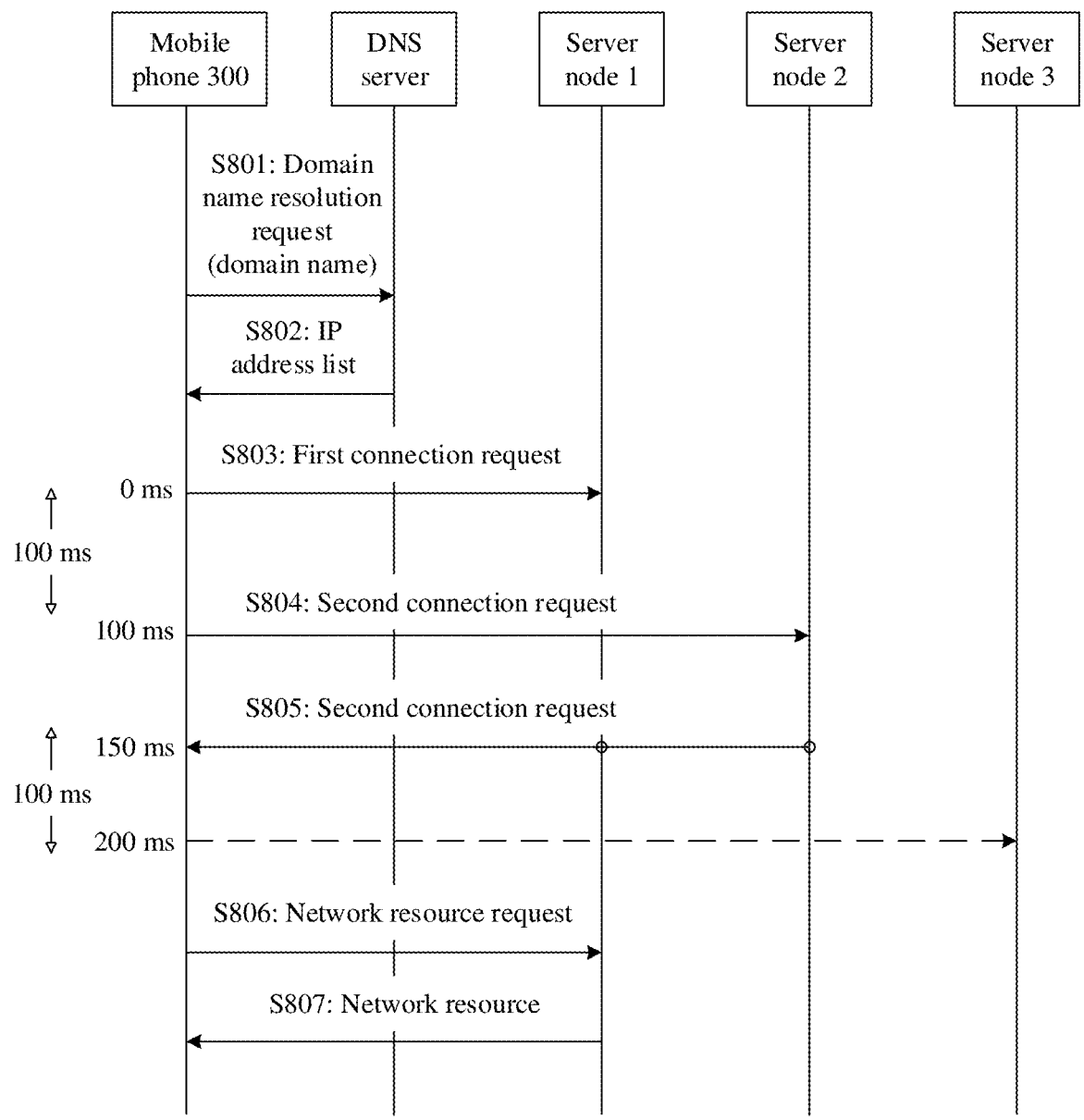
FIG. 8 is a schematic flowchart of a server node selection method according to an example embodiment.

FIG. 8 is a schematic flowchart of a routing selection method according to an embodiment of this application. In FIG. 8, the application scenario shown in FIG. 2 is used as an example, and an example in which t1 is 0 ms and T is 100 ms is used.

After the mobile phone 300 sends a domain name resolution request to the DNS server (S801), the DNS server obtains a domain name through resolution, to obtain an IP address list, and sends the IP address list to the mobile phone 300 (S802). The mobile phone 300 sends a first connection request to the server node 1 at a moment of 0 ms (S803). When the mobile phone 300 does not receive, within 100 ms, response information fed back by the server node 1, the mobile phone 300 sends a second connection request to the server node 2 at a moment of 100 ms (S804).

The mobile phone 300 simultaneously receives, within 150 ms, the response information fed back by the server node 1 and response information fed back by the server node 2 (S805). The following describes a processing manner of the mobile phone 300 when the mobile phone 300 simultaneously receives response information fed back by two server nodes.

In a first possible implementation, after receiving the response information fed back by the server node 1 and the response information fed back by the server node 2, the mobile phone 300 may first process one piece of response information (for example, the mobile phone 30 may randomly select one piece of response information for processing). If the mobile phone 300 first processes the response information fed back by the server node 1, the mobile phone 300 may directly establish a connection to the server node 1. In this case, the mobile phone 300 may not need to process the response information fed back by the server node 2, or may discard the response information fed back by the server node 2.

In this manner, when the mobile phone 300 simultaneously receives two pieces of response information, the mobile phone 300 establishes a connection to a server node corresponding to response information that is first processed. A reason is as follows: It can be learned from the foregoing content that a server node whose response time ranges from T to 2T (100 ms to 200 ms) has comparatively good network quality. Therefore, after the mobile phone 300 simultaneously receives the response information fed back by the server node 1 and the response information fed back by the server node 2, it is considered that both the server node 1 and the server node 2 have comparatively good network quality. Therefore, the mobile phone 300 establishes a connection to a server node whose response information fed back by the server node is first processed by the mobile phone 300.

In a second possible implementation, after the mobile phone 300 simultaneously receives the two pieces of response information, the mobile phone 300 may first determine specific server nodes that respectively send the two pieces of response information, and the mobile phone 300 may select a server node with a comparatively short response time and establish a connection to the server node.

For example, the mobile phone 300 may record a first moment at which the first connection request is sent to the server node 1, and record a second moment at which the response information sent by the server node 1 is received. A time difference between the first moment and the second moment is a response time of the server node 1. A response time of the server node 2 is also calculated in a similar manner, and details are not described again. The mobile phone 300 receives the two pieces of response information, and determines, based on identifiers of the server nodes carried in the two pieces of response information, specific server nodes that respectively send the two pieces of response information. Because the response time (50 ms) of the server node 2 is less than the response time (150 ms) of the server node 1, the mobile phone 300 establishes a connection to the server node 2. In this case, the mobile phone 300 may not process or may discard the response information fed back by the server node 1.

In a third possible implementation, after the mobile phone 300 simultaneously receives the two pieces of response information, the mobile phone 300 may first determine specific server nodes respectively corresponding to the two pieces of response information, and the mobile phone 300 establishes a connection to a server node to which the mobile phone 300 first sends a connection request.

For example, the mobile phone 300 may record a time or a sequence of sending connection requests to the server node 1 and the server node 2. For example, in FIG. 8, the mobile phone 300 first sends the connection request to the server node 1, and then sends the connection request to the server node 2. Therefore, after receiving the two pieces of response information, the mobile phone 300 may establish the connection to the server node 1. In this case, the mobile phone 300 may not process or may discard the response information fed back by the server node 2.

The foregoing several implementations are merely examples, and there may be another implementation during actual application. This is not limited in the embodiments of the present disclosure.

In this embodiment of this application, after the mobile phone 300 establishes the connection to the first server node in the IP address list, the first server node may also be faulty. FIG. 7 is used as an example. After the mobile phone 300 establishes the connection to the server node 1, the server node 1 may be faulty. Consequently, after sending a network resource request to the server node 1, the mobile phone 300 cannot receive, for a long time, a network resource fed back by the server node 1. Therefore, the following describes the processing manner of the mobile phone 300 after the server node 1 is faulty.

In a first possible implementation, the mobile phone 300 may record a response time of receiving each server node. After the first server node is faulty, the mobile phone 300 may re-determine the second server node based on the recorded response time of each server node and establish a connection to the second server node. FIG. 7 is used as an example. The response time of the server node 1 is 120 ms, and the response time of the server node 2 is 30 ms. When the server node 1 is faulty after the mobile phone 300 establishes the connection to the server node 1, the mobile phone 300 may establish the connection to the server node 2, and send the network resource request to the server node 2. This manner reduces a delay of obtaining a network resource by the mobile phone 300.

In a second possible implementation, after the mobile phone 300 is connected to the server node 1, if the server node 1 is faulty, the mobile phone 300 may also perform the procedure shown in FIG. 5 again. Because the server node 1 is faulty, when the mobile phone 300 performs the procedure shown in FIG. 5, the mobile phone 300 may directly send the second connection request to the server node 2 without a need of sending the first connection request to the server node 1, and does not receive, within the duration T, the response information fed back by the service node 2. In this case, the mobile phone 300 sends a third connection request to a service node 3, and select one server node from the server node 2 and the server node 3.

Figures 9, 10:
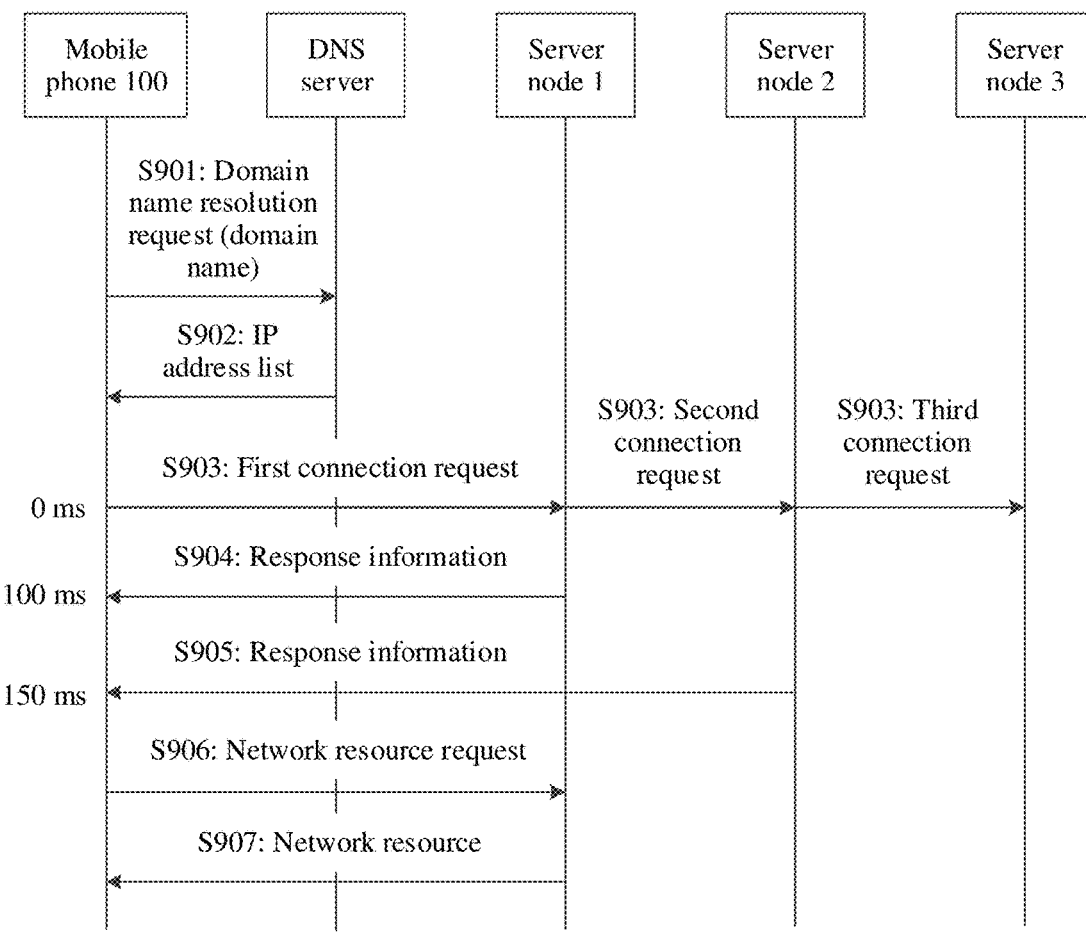
FIG. 9 is a schematic flowchart of a server node selection method according to an example embodiment.
FIG. 10 is a schematic diagram of a process of a three-way handshake between a client and a first server node according to an example embodiment.

In the embodiments shown in FIG. 5 to FIG. 8, the mobile phone 300 sends connection requests to the server nodes 1 to 3 at a specific time interval. Actually, the mobile phone 300 may alternatively simultaneously send connection requests to the server nodes 1 to 3. FIG. 9 is a schematic flowchart of another server node selection method according to an embodiment of this application. In the method, the mobile phone 300 simultaneously sends connection requests to the server nodes 1 to 3 (S903), and the mobile phone 300 first receives response information fed back by the server node 1 (S904). Therefore, the mobile phone 300 establishes a connection to the server node 1.

It should be noted that various implementations in the embodiment shown in FIG. 9 and the embodiments shown in FIG. 5 to FIG. 8 may be combined to achieve different technical effects. For example, in the embodiment shown in FIG. 9, if the mobile phone 300 simultaneously receives response information fed back by the server nodes 1 to 3, processing may be performed in the processing manner in the embodiment shown in FIG. 7.

In this embodiment of this application, after selecting the first server node to establish the connection and requesting a network resource from the first server node, the mobile phone 300 may store a domain name in a URL and an IP address of the first server node for a period of time. In this period of time, if the mobile phone 300 re-initiates another URL, if a domain name carried in the URL is the same as the stored domain name, and a time in which the mobile phone 300 re-initiates another URL does not exceed the period of time, the mobile phone 300 directly sends a network resource request corresponding to the another URL to the first server node, without a need of performing the procedure shown in FIG. 5, so as to request a network resource. If the time in which the mobile phone 300 re-initiates another URL exceeds the period of time, the mobile phone 300 may perform the procedure shown in FIG. 5 again. In this case, the mobile phone 300 may delete the domain name and the IP address of the first server node. The mobile phone 300 performs the procedure shown in FIG. 5 again. After establishing a connection to a specific server node, the mobile phone 300 stores the domain name and an IP address of the server node for a period of time again.

A person skilled in the art may determine, based on an actual situation, a period of time for storing the domain name and the IP address of the first server node, for example, 10 minutes.

The following describes, by using an example, the technical effects implemented by using the server node selection methods provided in the embodiments of this application.

FIG. 10 is a schematic diagram of a process of testing a three-way handshake between a client and a fault-free server node. An IP address of the client is 100.65.147.165, and an IP address of the fault-free server node is 114.115.190.71. The first row is a first handshake process, the second row is a second handshake process, and the third row is a third handshake process. The first column indicates a time, the second column indicates a TCP protocol, the third column indicates a transmit end, and the fourth column indicates a receive end. As shown in FIG. 8, in the first row, at a moment of 4.331427 s, the client (the transmit end) sends a first handshake request to the fault-free server node (the receive end). In the second row, at a moment of 4.375664 s, the fault-free server node (the transmit end) sends response information (that is, a second handshake request) to the client (the receive end). In the third row, at a moment of 4.375785 s, the client (the transmit end) sends a third handshake request to the fault-free server node (the receive end), and so on, until the client establishes a connection to the fault-free server node. For example, the first connection request shown in FIG. 5 is the first handshake request. To be specific, a duration from a moment at which the mobile phone 300 sends the first handshake request to a moment at which the mobile phone 300 receives the second handshake request is: 4.375664 4.331427=44 ms. It can be learned that a period of time consumed from a moment at which the mobile phone 300 sends a connection request to the server node 1 to a moment at which the mobile phone 300 receives response information fed back by the server node is within 40 ms to 50 ms.

In other words, if the server node 1 is a fault-free server node, the mobile phone 300 may receive, within 40 ms to 50 ms, response information fed back by the server node 1. In the foregoing examples (6A to 6C, and 7), an example in which T is 100 ms is used. Therefore, there is a relatively low probability that the mobile phone 300 cannot receive, within 100 ms, the response information fed back by the server node 1. It is assumed that the probability is 10%, in other words, the mobile phone 300 has a probability of 10% to send a second connection request to the server node 2. For the server node 2, if the server node 2 is not faulty, a probability that the mobile phone 300 cannot receive, within 100 ms, the response information fed back by the server node 2 is also 10%, in other words, the mobile phone 300 has only a probability of 10%*10%=1% to send a third connection request to the server node 3. If there are a large quantity of server nodes, the rule may be followed.

It can be learned that a probability that the client tries a new server node gradually decreases, in other words, a probability that the client finds a proper server node after trying a plurality of server nodes is relatively low. In addition, after the client fails to try a first server node, a time difference between a moment of trying the first server node and a moment of trying a second server node is 100 ms, which is relatively short and is not obviously perceived by a user. In other words, in a user perception-free case, the mobile phone 300 already tries to establish a connection to the second server node. This helps improve user experience.

The implementations of this application may be randomly combined to achieve different technical effects.

In the foregoing embodiments provided in this application, the methods provided in the embodiments of this application are described from the perspective of using a client as an execution body. To implement functions in the methods provided in the embodiments of this application, the client may include a hardware structure and/or a software module, and implement the foregoing functions in a form of the hardware structure, the software module, or a combination of the hardware structure and the software module. Whether a function in the foregoing functions is performed in a manner of the hardware structure, the software module, or the combination of the hardware structure and the software module depends on particular applications and design constraints of the technical solutions.

Figure 11:
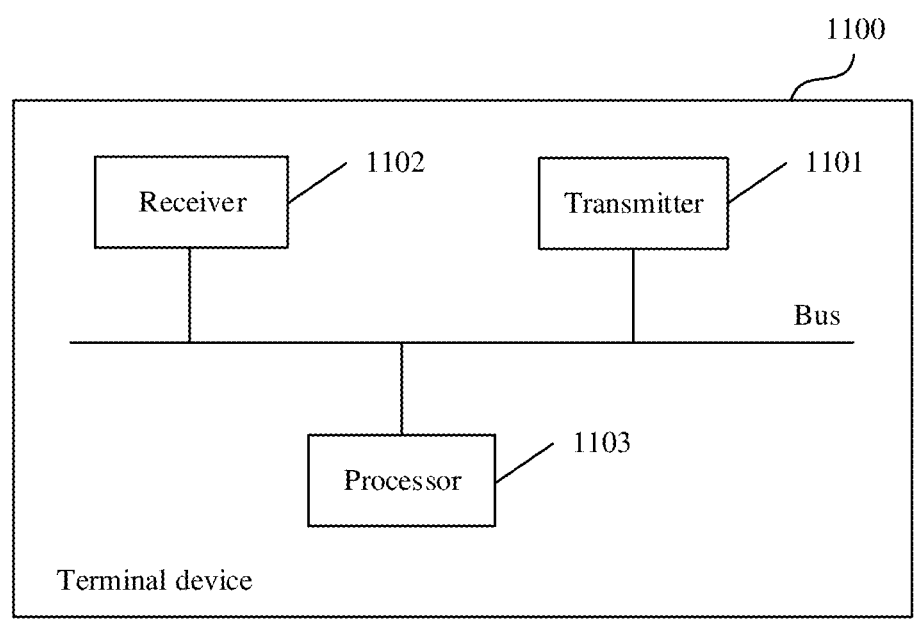
FIG. 11 is a schematic structural diagram of a terminal device according to an example embodiment.

Based on a same concept, FIG. 11 shows a terminal device 1100 according to an embodiment of this application. As shown in FIG. 11, the terminal 1100 may include a transmitter 1101, a receiver 1102, and a processor 1103. The transmitter 1101, the receiver 1102, and the processor 1103 may be connected by using one or more communications buses. Certainly, during actual application, the transmitter 1101, the receiver 1102, and the processor 1103 may not be of a bus structure, but may be of another structure, for example, a star structure. This is not specifically limited in the embodiments of the present disclosure.

The transmitter 1101 may be configured to perform S501, S504, S503, and S506 in the embodiment shown in FIG. 5, and/or configured to support another process of the technology described in this specification. Alternatively, the transmitter 1101 may be configured to perform S601, S603, S604, and S607 in the embodiment shown in FIG. 6, and/or configured to support another process of the technology described in this specification. Alternatively, the transmitter 1101 may be configured to perform S701, S703, S704, and S707 in the embodiment shown in FIG. 7, and/or configured to support another process of the technology described in this specification. Alternatively, the transmitter 1101 may be configured to perform S801, S803, S804, and S806 in the embodiment shown in FIG. 8, and/or configured to support another process of the technology described in this specification. Alternatively, the transmitter 1101 may be configured to perform S901, S903, and S906 in the embodiment shown in FIG. 9, and/or configured to support another process of the technology described in this specification.

The receiver 1102 is configured to perform S502, S505, and S507 in the embodiment shown in FIG. 5, and/or configured to support another process of the technology described in this specification. Alternatively, the receiver 1102 is configured to perform S602, S605, S606, and S608 in the embodiment shown in FIG. 6, and/or configured to support another process of the technology described in this specification. Alternatively, the receiver 1102 is configured to perform S702, S705, S706, and S708 in the embodiment shown in FIG. 7, and/or configured to support another process of the technology described in this specification. Alternatively, the receiver 1102 is configured to perform S802, S805, and S807 in the embodiment shown in FIG. 8, and/or configured to support another process of the technology described in this specification. Alternatively, the receiver 1102 is configured to perform S902, S904, S905, and S907 in the embodiment shown in FIG. 9, and/or configured to support another process of the technology described in this specification.

The processor 1103 is configured to trigger to send a connection request, and select a server node based on response information, so as to establish a connection to obtain a network resource.

Figure 12:
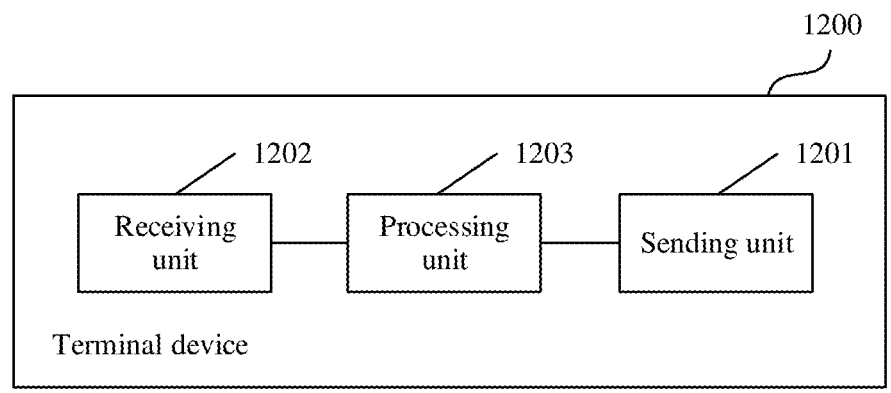
FIG. 12 is a schematic structural diagram of another terminal device according to an example embodiment.

Based on a same concept, FIG. 12 shows a terminal device 1200 according to an embodiment of this application. As shown in FIG. 9, the terminal 1200 may include a sending unit 1201, a processing unit 1203, and a receiving unit 1202. The processing unit 1203 may be OKhttp in FIG. 4, and the sending unit 1201 and the receiving unit 1202 may be Netd or Libc.

The sending unit 1201 may be configured to perform S501, S503, S504, and S506 in the embodiment shown in FIG. 5, and/or configured to support another process of the technology described in this specification. Alternatively, the sending unit 1201 may be configured to perform S601, S603, S604, and S607 in the embodiment shown in FIG. 6, and/or configured to support another process of the technology described in this specification. Alternatively, the sending unit 1201 may be configured to perform S701, S703, S704, and S707 in the embodiment shown in FIG. 7, and/or configured to support another process of the technology described in this specification. Alternatively, the sending unit 1201 may be configured to perform S801, S803, S804, and S806 in the embodiment shown in FIG. 8, and/or configured to support another process of the technology described in this specification. Alternatively, the sending unit 1201 may be configured to perform S901, S903, and S906 in the embodiment shown in FIG. 9, and/or configured to support another process of the technology described in this specification.

The receiving unit 1202 is configured to perform S502, S505, and S507 in the embodiment shown in FIG. 5, and/or configured to support another process of the technology described in this specification. Alternatively, the receiving unit 1202 is configured to perform S602, S605, S606, and S608 in the embodiment shown in FIG. 6, and/or configured to support another process of the technology described in this specification. Alternatively, the receiving unit 1202 is configured to perform S702, S705, S706, and S708 in the embodiment shown in FIG. 7, and/or configured to support another process of the technology described in this specification. Alternatively, the receiving unit 1202 is configured to perform S802, S805, and S807 in the embodiment shown in FIG. 8, and/or configured to support another process of the technology described in this specification. Alternatively, the receiving unit 1202 is configured to perform S902, S904, S905, and S907 in the embodiment shown in FIG. 9, and/or configured to support another process of the technology described in this specification.

The processing unit 1203 is configured to trigger to send a connection request, and select a server node based on response information, so as to establish a connection to obtain a network resource.

Figure 13:
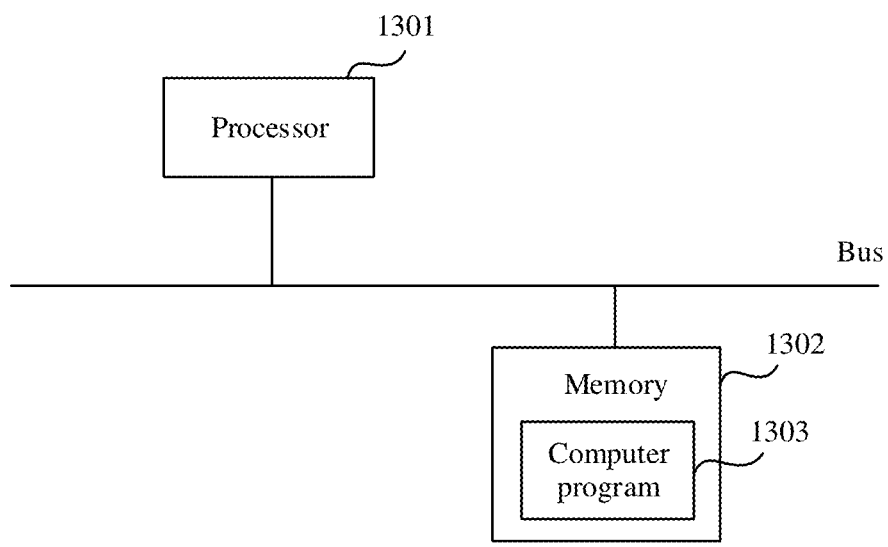
FIG. 13 is a schematic structural diagram of another terminal device according to an example embodiment.

Based on a same concept, FIG. 13 shows a terminal device 1300 according to an embodiment of this application. As shown in FIG. 13, some other embodiments of this application include a terminal device 1300. The terminal device 1300 may include one or more processors 1301, a memory 1302, and one or more computer programs 1303. The foregoing components may be connected by using one or more communications buses. The one or more computer programs 1303 are stored in the memory 1302 and are configured to be executed by the one or more processors 1301. The one or more computer programs 1303 include instructions, and the instructions may be used to enable the terminal device to perform the steps in FIG. 5 to FIG. 9 and corresponding embodiments.

An embodiment of this application further provides a computer storage medium. The storage medium may include a memory. The memory may store a program. When the program is executed, a terminal device is enabled to perform all the steps described in the method embodiments shown in FIG. 5 or FIG. 9.

An embodiment of this application further provides a computer program product. When the computer program product is run on a terminal device, the terminal device is enabled to perform all the steps described in the method embodiments shown in FIG. 5 to FIG. 9.

With descriptions of the foregoing implementations, a person skilled in the art may clearly understand that the embodiments of this application may be implemented by hardware, firmware, or a combination thereof. When the embodiments of this application are implemented by software, the foregoing functions may be stored in a computer-readable medium or transmitted as one or more instructions or code in the computer-readable medium. The computer-readable medium includes a computer storage medium and a communications medium, and the communications medium includes any medium that enables a computer program to be transmitted from one place to another. The storage medium may be any available medium accessible to a computer. This is used as an example but is not limited to: The computer-readable medium may include a RAM, a ROM, an electrically erasable programmable read-only memory (EEPROM), a compact disc read-only memory (CD-ROM) or another compact disc storage, a magnetic disk storage medium or another magnetic storage device, or any other medium that can be configured to carry or store desired program code in a form of an instruction or a data structure and that can be accessed by a computer. In addition, any connection may be appropriately defined as a computer-readable medium. For example, if software is transmitted from a website, a server, or another remote source by using a coaxial cable, an optical fiber/cable, a twisted pair, a digital subscriber line (DSL), or wireless technologies such as infrared ray, radio, and microwave, the coaxial cable, optical fiber/cable, twisted pair, DSL, or wireless technologies such as infrared ray, radio, and microwave are included in fixation of a medium to which they belong. A disk and disc used in the embodiments of this application include a compact disc (CD), a laser disc, an optical disc, a digital video disc (DVD), a floppy disk, and a Blu-ray disc. The disk usually magnetically copies data, and the disc optically copies data in a laser manner. The foregoing combination should also be included in the protection scope of the computer-readable medium.

In conclusion, what is described above is merely the embodiments of this application, but is not intended to limit the protection scope of this application. Any modification, equivalent replacement, or improvement made according to the disclosure of this application shall fall within the protection scope of this application.

What is claimed is:

1. A server node selection method, comprising:
   sending, by a terminal device, a domain name resolution request to a DNS server, wherein the domain name resolution request carries a domain name, and the domain name resolution request requests an IP address corresponding to the domain name;
   receiving, by the terminal device, a plurality of IP addresses fed back by the DNS server in response to the domain name resolution request, wherein each of the plurality of IP addresses corresponds to a server node in a plurality of server nodes;
   sending, by the terminal device, a connection request to one server node in the plurality of server nodes at a first moment;
   determining whether the terminal device receives, before a second moment, response information fed back by the one server node in response to the connection request;
   upon determination that the terminal device receives, before the second moment, the response information fed back by the one server node, establishing, by the terminal device, a connection to the one server node;
   upon determination that the terminal device does not receive, before the second moment, the response information fed back by the one server node, sending, by the terminal device, another connection request to another server node in the plurality of server nodes at the second moment;
   receiving, by the terminal device, first response information at a fourth moment, the fourth moment being a moment between the second moment and a third moment; and
   establishing, by the terminal device, a connection to a server node that sends the first response information, wherein the server node that sends the first response information is the one server node or the another server node,
   wherein the method further comprises:
   sending, by the terminal device, a network resource request to the server node that sends the first response information, wherein the network resource request requests a network resource;
   determining whether the terminal device does not receive, within a second preset duration, the network resource fed back by the server node that sends the first response information in response to the network resource request; and
   upon determination that the terminal device does not receive, within the second preset duration, the network resource fed back by the server node that sends the first response information, sending, by the terminal device, a network resource request to the server node that sends second response information.

2. The method according to claim 1, further comprising:
   upon receiving second response information, discarding or skipping responding to, by the terminal device, the second response information, wherein a server node that sends the second response information is the one server node or the another server node, and is different from the server node that sends the first response information.

3. The method according to claim 1, wherein the first response information is sent by the one server node, before establishing of the connection to the one server node, the terminal device waits for a first preset duration starting from a fourth moment at which the terminal device receives the first response information, to determine that the terminal device does not receive, within the first preset duration, response information sent by the another server node, and the first preset duration is shorter than an interval between the fourth moment and the third moment.

4. The method according to claim 1, wherein an interval between the first moment and the second moment is the same as an interval between the second moment and the third moment.

5. A terminal device, comprising at least one processor and a memory, wherein the memory is configured to store one or more computer programs that, when executed by the at least one processor, enable the terminal device to perform operations comprising:
   sending a domain name resolution request to a DNS server, wherein the domain name resolution request carries a domain name, and the domain name resolution request requests an IP address corresponding to the domain name;
   receiving a plurality of IP addresses fed back by the DNS server in response to the domain name resolution request, wherein each of the plurality of IP addresses corresponds to a server node in a plurality of server nodes;
   sending a connection request to one server node in the plurality of server nodes at a first moment;
   determining whether the terminal device receives, before a second moment, response information fed back by the one server node in response to the connection request;
   upon determination that the terminal device receives, before the second moment, the response information fed back by the one server node, establishing a connection to the one server node;
   upon determination that the terminal device does not receive, before the second moment, the response information fed back by the one server node, sending another connection request to another server node in the plurality of server nodes at the second moment;
   receiving first response information at a fourth moment, the fourth moment being between the second moment and a third moment;
   establishing a connection to a server node that sends the first response information, wherein the server node that sends the first response information is the one server node or the another server node;
   sending, by the terminal device, a network resource request to the server node that sends the first response information, wherein the network resource request requests a network resource;
   determining whether the terminal device does not receive, within a second preset duration, the network resource fed back by the server node that sends the first response information in response to the network resource request; and
   upon determination that the terminal device does not receive, within the second preset duration, the network resource fed back by the server node that sends the first response information, sending, by the terminal device, a network resource request to the server node that sends second response information.

6. The terminal device according to claim 5, wherein, when the one or more computer programs stored in the memory are executed by the at least one processor, the terminal device is further enabled to perform operations comprising:
receiving second response information; and
discarding or skipping responding to the second response information, wherein a server node that sends the second response information is the one server node or the another server node, and is different from the server node that sends the first response information.

7. The terminal device according to claim 5, wherein, when the one or more computer programs stored in the memory are executed by the at least one processor, the terminal device is further enabled to perform operations comprising:
determining that the first response information is sent by the one server node; and
waiting for a first preset duration starting from a fourth moment at which the terminal device receives the first response information, to determine that the terminal device does not receive, within the first preset duration, second response information sent by the another server node, wherein
the first preset duration is shorter than an interval between the fourth moment and the third moment.

8. The terminal device according to claim 5, wherein an interval between the first moment and the second moment is the same as an interval between the second moment and the third moment.

9. A non-transitory computer-readable storage medium, comprising one or more computer programs that, when run on a terminal device, enable the terminal device perform operations comprising:
sending a domain name resolution request to a DNS server, wherein the domain name resolution request carries a domain name, and the domain name resolution request requests an IP address corresponding to the domain name;
receiving a plurality of IP addresses fed back by the DNS server in response to the domain name resolution request, wherein each of the plurality of IP addresses corresponds to a server node in a plurality of server nodes;
sending a connection request to one server node in the plurality of server nodes at a first moment;
determining whether the terminal device receives, before a second moment, response information fed back by the one server node in response to the connection request;
upon determination that the terminal device receives, before the second moment, the response information fed back by the one server node, establishing a connection to the one server node;
upon determination that the terminal device does not receive, before the second moment, the response information fed back by the one server node, sending another connection request to another server node in the plurality of server nodes at the second moment;
receiving first response information at a fourth moment, the fourth moment being between the second moment and a third moment;
establishing a connection to a server node that sends the first response information, wherein the server node that sends the first response information is the one server node or the another server node;
sending, by the terminal device, a network resource request to the server node that sends the first response information, wherein the network resource request requests a network resource;
determining whether the terminal device does not receive, within a second preset duration, the network resource fed back by the server node that sends the first response information in response to the network resource request; and
upon determination that the terminal device does not receive, within the second preset duration, the network resource fed back by the server node that sends the first response information, sending, by the terminal device, a network resource request to the server node that sends second response information.

10. The non-transitory computer-readable storage medium according to claim 9, wherein, when the one or more computer programs are run on the terminal device, the terminal device is further enabled to perform operations comprising:
receiving second response information; and
discarding or skipping responding to the second response information, wherein a server node that sends the second response information is the one server node or the another server node, and is different from the server node that sends the first response information.

11. The non-transitory computer-readable storage medium according to claim 9, wherein, when the one or more computer programs are run on the terminal device, the terminal device is further enabled to perform operations comprising:
determining that the first response information is sent by the one server node; and
waiting for a first preset duration starting from a fourth moment at which the terminal device receives the first response information, to determine that the terminal device does not receive, within the first preset duration, response information sent by the another server node, wherein
the first preset duration is shorter than an interval between the fourth moment and the third moment.

12. The non-transitory computer-readable storage medium according to claim 9, wherein an interval between the first moment and the second moment is the same as an interval between the second moment and the third moment.

* * * * *